United States Patent
Nishino

(10) Patent No.: US 9,105,104 B2
(45) Date of Patent: Aug. 11, 2015

(54) IMAGE PROCESSING APPARATUS, IMAGE PROCESSING METHOD, AND PROGRAM

(75) Inventor: Katsuaki Nishino, Kanagawa (JP)

(73) Assignee: Sony Corporation, Tokyo (JP)

(*) Notice: Subject to any disclaimer, the term of this patent is extended or adjusted under 35 U.S.C. 154(b) by 191 days.

(21) Appl. No.: 13/592,926

(22) Filed: Aug. 23, 2012

(65) Prior Publication Data

US 2013/0071032 A1 Mar. 21, 2013

(30) Foreign Application Priority Data

Sep. 16, 2011 (JP) ................. 2011-202748

(51) Int. Cl.
| | |
|---|---|
| *G06K 9/46* | (2006.01) |
| *G06T 7/20* | (2006.01) |
| *G06K 9/38* | (2006.01) |
| *G06T 7/00* | (2006.01) |

(52) U.S. Cl.
CPC ............. *G06T 7/2053* (2013.01); *G06K 9/38* (2013.01); *G06T 7/0087* (2013.01); *G06T 2207/20076* (2013.01); *G06T 2207/30232* (2013.01); *G06T 2207/30236* (2013.01)

(58) Field of Classification Search
CPC .................................................... G06T 7/0087
USPC ........... 382/195, 130, 128, 275; 348/334, 169
See application file for complete search history.

(56) References Cited

U.S. PATENT DOCUMENTS

| | | | |
|---|---|---|---|
| 8,446,468 B1* | 5/2013 | Medioni et al. ................ 348/144 |
| 2006/0268128 A1* | 11/2006 | Miwa ............................. 348/234 |
| 2010/0020244 A1* | 1/2010 | Mitsuya et al. ................ 348/699 |
| 2012/0169871 A1* | 7/2012 | Sablak et al. .................. 348/143 |

FOREIGN PATENT DOCUMENTS

| | | |
|---|---|---|
| JP | 2004-265291 | 9/2004 |
| JP | 2006-331306 | 12/2006 |
| JP | 2008-257693 | 10/2008 |
| WO | WO 2009/005141 A1 | 1/2009 |

* cited by examiner

*Primary Examiner* — Mike Rahmjoo
(74) *Attorney, Agent, or Firm* — Sony Corporation

(57) ABSTRACT

Provided is an image processing apparatus including a generation unit configured to generate a background model of a multinomial distribution from an acquired image, and generate a background, and a determination unit configured to determine whether a background with high reliability can be generated from the background model generated by the generation unit.

12 Claims, 22 Drawing Sheets

FIG.3
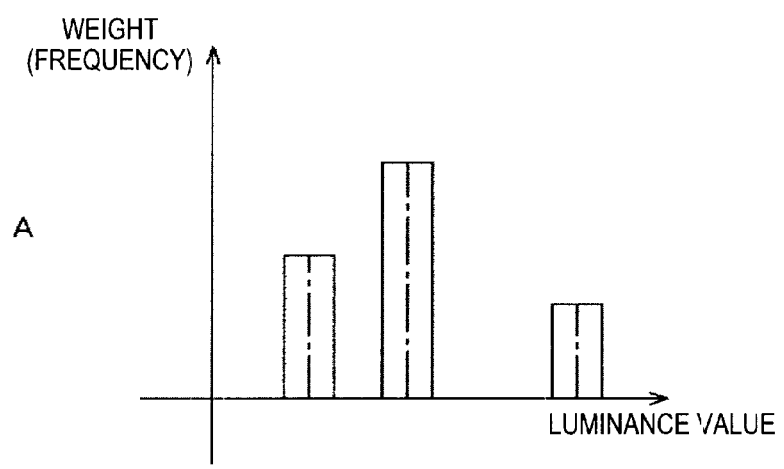
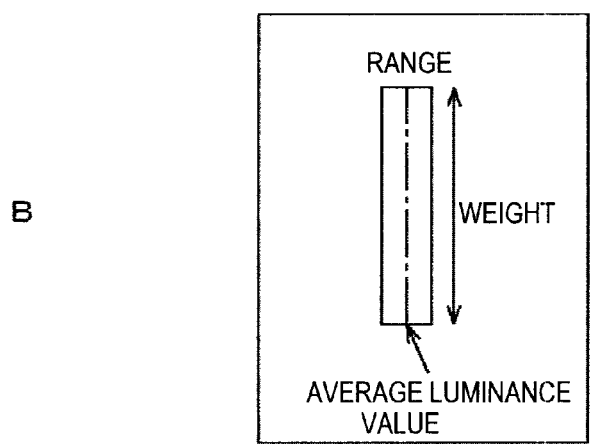

FIG.5
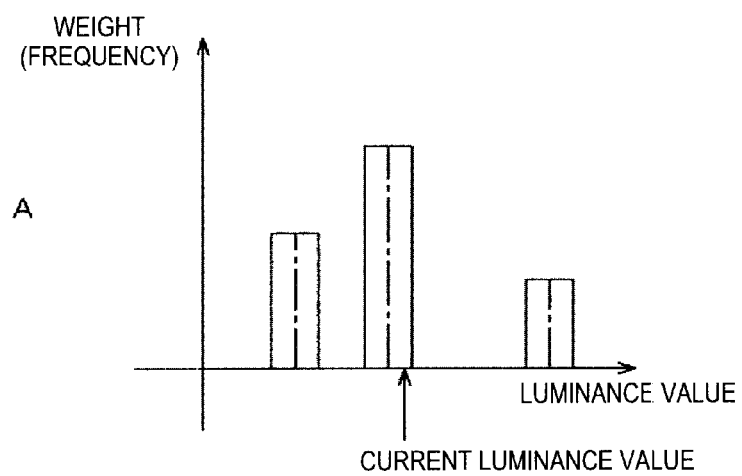
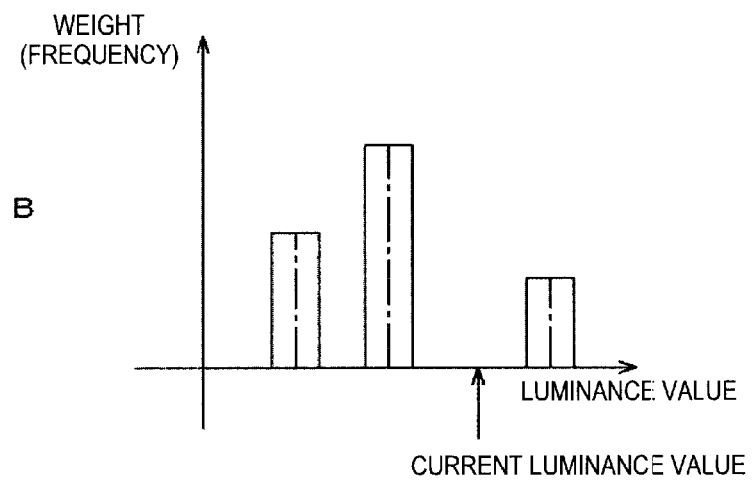

FIG.9
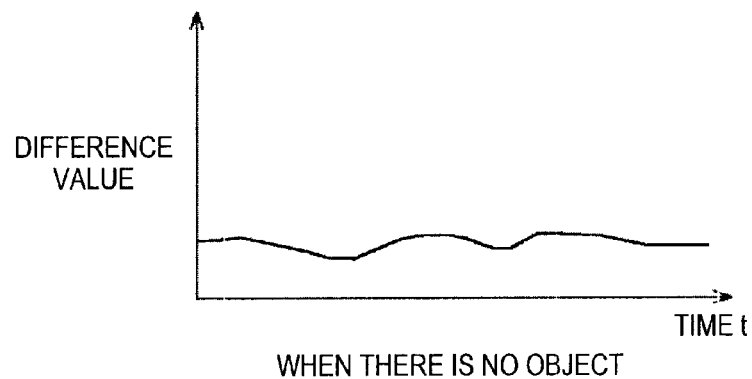
WHEN THERE IS NO OBJECT
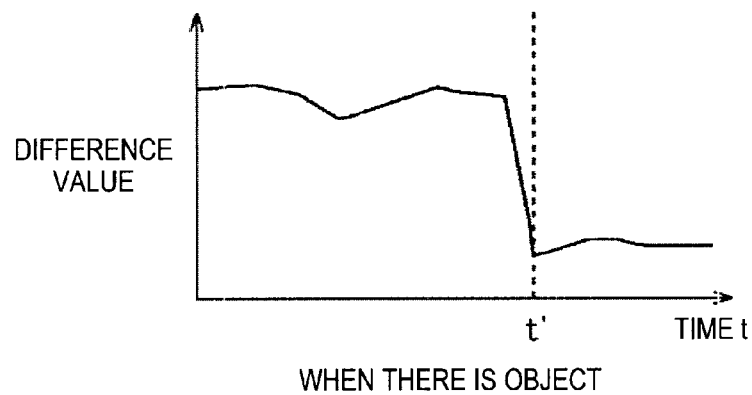
WHEN THERE IS OBJECT
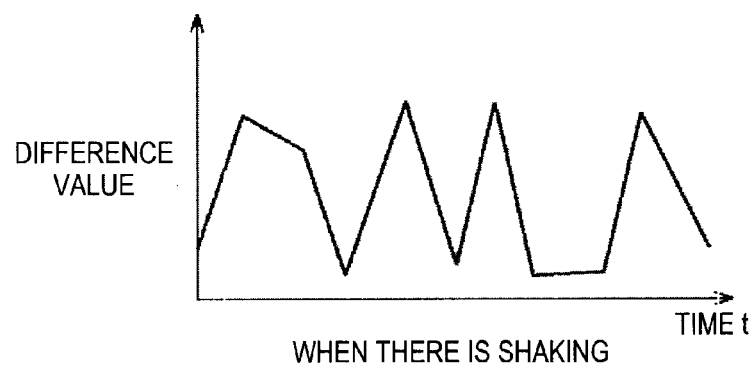
WHEN THERE IS SHAKING

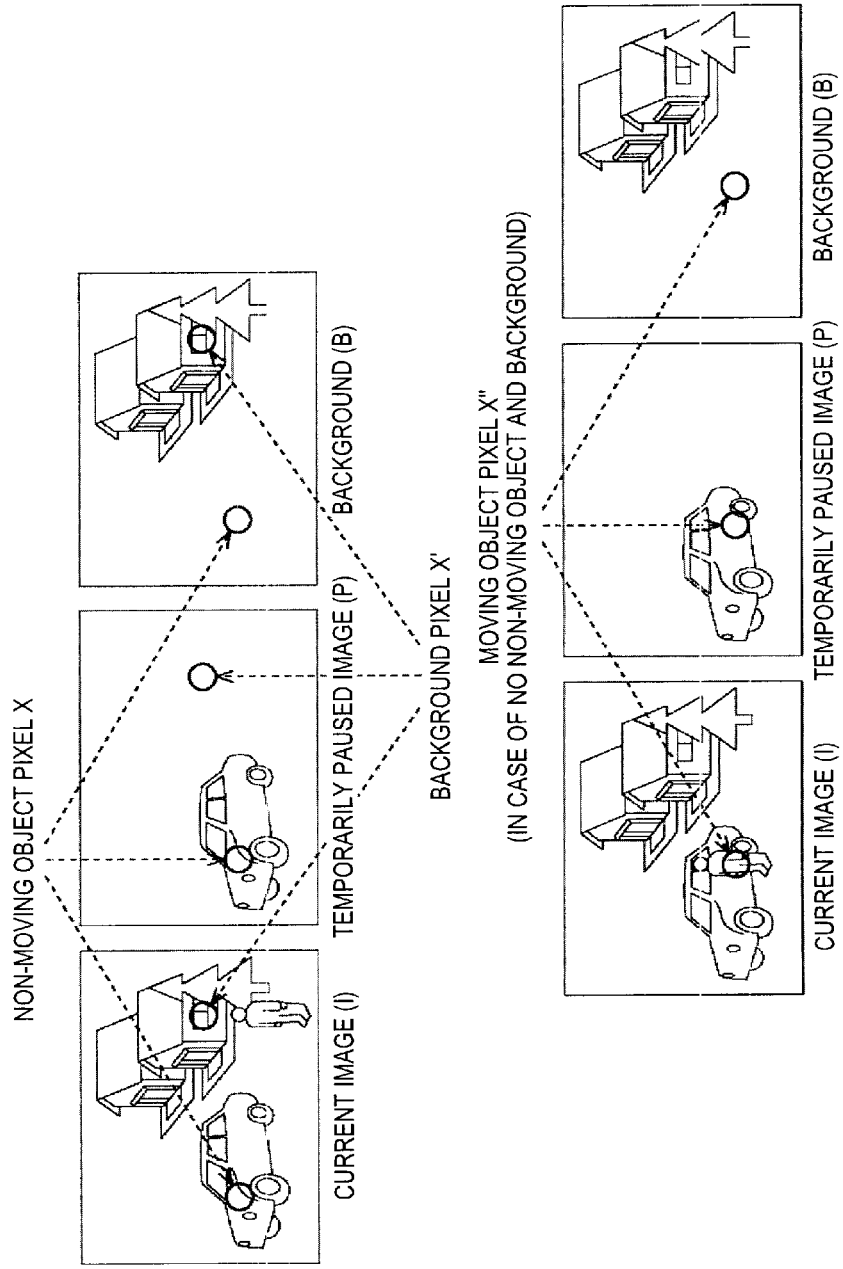

FIG.12

A | INCREMENT RELIABILITY: WHEN PIXEL IS PROBABLY NON-MOVING OBJECT

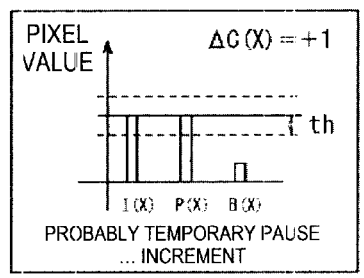

$\begin{cases} \cdot |I(X)-P(X)| < th \\ \cdot |I(X)-B(X)| >= th \\ \cdot |B(X)-P(X)| >= th \end{cases}$

B | DECREMENT RELIABILITY: WHEN PIXEL IS PROBABLY BACKGROUND

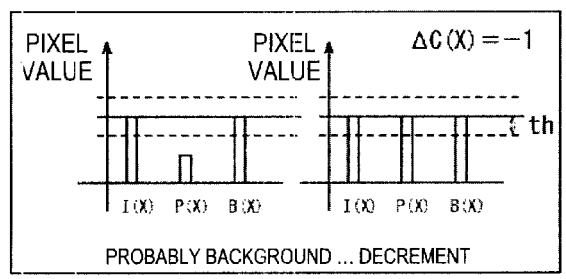

$\begin{cases} \cdot |I(X)-P(X)| >= th \\ \cdot |P(X)-B(X)| >= th \\ \cdot |B(X)-I(X)| < th \end{cases}$ $\begin{cases} \cdot |I(X)-P(X)| < th \\ \cdot |P(X)-B(X)| < th \\ \cdot |B(X)-I(X)| < th \end{cases}$

C | NO CHANGE: IN CASE OF NO NON-MOVING OBJECT AND BACKGROUND

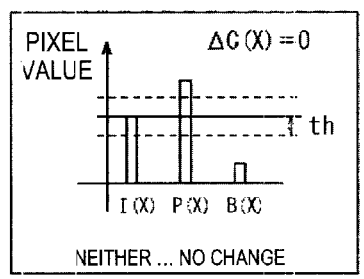

$\begin{cases} \cdot |I(X)-P(X)| >= th \\ \cdot |P(X)-B(X)| >= th \\ \cdot |B(X)-I(X)| >= th \end{cases}$

FIG.13

| $\|I(X)-P(X)\|<th$ | $\|B(X)-P(X)\|<th$ | $\|I(X)-B(X)\|<th$ | RELIABILITY |
|---|---|---|---|
| Yes | Yes | Yes | DECREMENT : - |
| Yes | No | No | INCREMENT : + |
| No | No | Yes | DECREMENT : - |
| No | No | No | NO CHANGE : 0 |
| No | Yes | No | DECREMENT : - |
| Other | | | DECREMENT : - |

IMAGE PROCESSING APPARATUS, IMAGE PROCESSING METHOD, AND PROGRAM

BACKGROUND

The present technology relates to an image processing apparatus, an image processing method, and a program, and more particularly, to an image processing apparatus, an image processing method, and a program, by which it is possible to suppress erroneous detection in the detection of a non-moving object, that is, in the detection of an object being left behind or of an object being carried away.

For example, as technology of detecting that a suspicious object has been left behind or exhibits shown in a showroom have been carried away, there is a method of detecting a part, which is not a background and does not move, as a non-moving object in an image.

A non-moving object detection method of detecting a non-moving object includes a method in which a stationary area is detected from an image and the newly detected stationary area is registered as a background to create a plurality of backgrounds, and even when a stationary object appears in front of another stationary object and the two stationary objects overlap each other, it is possible to separately detect the two stationary objects (for example, refer to WO/2009/005141).

Furthermore, a non-moving object detection method includes a method in which update and the like of a background are performed in a plurality of time scales to guarantee robustness against disturbance (for example, refer to Japanese Unexamined Patent Application Publication No. 2008-257693).

In addition, in the non-moving object detection method disclosed in WO/2009/005141, shaking and the like of trees may be erroneously detected as a stationary object (a non-moving object). Moreover, in the non-moving object detection method disclosed in WO/2009/005141, in order to separate stationary objects from each other, since various types of feature amounts are calculated and clustering is further necessary, an operation amount is increased, so that it is not suitable for a realtime process.

Furthermore, in the non-moving object detection method disclosed in Japanese Unexamined Patent Application Publication No. 2008-257693, when two stationary objects overlap each other, the two stationary objects are not guaranteed to be appropriately detected as immobile bodies.

Furthermore, according to representative detection technology using a background image in moving object detection, non-moving object detection and the like, a normal background may not be generated, and an erroneous result may be obtained in an area through which a person or an object such as a vehicle frequently passes. In order to cope with such a case, Japanese Unexamined Patent Application Publication No. 2004-265291 has proposed technology of calculating dispersion of a luminance value as a variation of each pixel to determine whether the area is an effective area which can be processed. Furthermore, a background difference method has been proposed to perform processes by excluding an area determined as an ineffective area.

However, according to the method proposed in Japanese Unexamined Patent Application Publication No. 2004-265291, since an effective area is determined based on standard deviation (dispersion) of a luminance value, it is not possible to discriminate only a situation in which a background is actually difficult to create. For example, when a background is detected using a multinomial distribution, the background is difficult to create in a situation in which a person frequently passes through, but the background can be generated in a situation in which the difference in luminance values is large such as flicker of a light. According to the method proposed in Japanese Unexamined Patent Application Publication No. 2004-265291, since the effective area is determined based on the dispersion of the luminance value, this may be determined as the same "ineffective area." Therefore, since it is not possible to determine the presence or absence of an undetectable area due to the difficulty of background creation, accurate generation of a background may not be possible.

Furthermore, Japanese Unexamined Patent Application Publication No. 2006-331306 has proposed a method of determining a timewise change in each pixel as an intermediate class, an unstable class and the like. However, according to this determination method, since stability is determined based only on weights of a plurality of distributions, it is difficult to determine an area in which a change has occurred in a short time, or an actually difficult area due to frequent passage. Therefore, also in this case, accurate generation of a background may not be possible.

SUMMARY

As a non-moving object detection method, there have been increased demands for a method capable of detecting a non-moving object with high accuracy while suppressing erroneous detection.

In light of the foregoing, an object of the present technology is to perform robust non-moving object detection while suppressing erroneous detection.

An image processing apparatus of an embodiment of the present technology includes: a generation unit configured to generate a background model of a multinomial distribution from an acquired image, and generate a background; and a determination unit configured to determine whether a background with high reliability can be generated from the background model generated by the generation unit.

The background model includes a distribution in which a luminance value at a predetermined coordinate has been associated with appearance frequency of the luminance value, and when a distribution with highest frequency is larger than a predetermined value, the determination unit determines that the background with high reliability can be generated.

The predetermined value is calculated from a number of terms of the multinomial distribution and a number of updates of the background model.

An area that is determined by the determination unit as an area in which the background with high reliability cannot be generated is presented to a user.

The image processing apparatus further includes: a moving object detection unit configured to detect a moving object, which is an image different from the background generated by the generation unit, from a current image; a temporary pause determination unit configured to determine whether the moving object is paused for a predetermined time period or more; a reliability processing unit configured to calculate non-moving object reliability for a pixel of the current image using a temporarily paused image including a temporarily paused object serving as the moving object which is paused for a predetermined time period or more, the non-moving object reliability representing likelihood of being a non-moving object which is an image different from the background that does not change for a predetermined time period or more; and a non-moving object detection unit configured to detect a non-moving object from the current image based on the non-moving object reliability.

An image processing method of an embodiment of the present technology includes: generating a background model of a multinomial distribution from an acquired image, and generating a background; and determining whether a background with high reliability can be generated from the generated background model.

A program of an embodiment of the present technology causes a computer to function as: a generation unit configured to generate a background model of a multinomial distribution from an acquired image, and generate a background; and a determination unit configured to determine whether a background with high reliability can be generated from the background model generated by the generation unit.

In accordance with the image processing apparatus, the image processing method, and the program according to an embodiment of the present technology, a background model of a multinomial distribution is generated from an acquired image, and it is determined whether a background with high reliability can be generated from the generated background model.

In addition, the image processing apparatus may be an independent apparatus, or an internal block constituting one apparatus.

Furthermore, the program can be provided through transmission via a transmission medium or registration on a recording medium.

According to the present technology, it is possible to perform robust non-moving object detection while suppressing erroneous detection.

BRIEF DESCRIPTION OF THE DRAWINGS

FIG. 3 is a diagram for describing a background model;

FIG. 5 is a diagram for describing a background model;

FIG. 9 is a diagram for describing a moving object detection principle in a moving object detection unit 31;

FIG. 11 is a diagram for describing a process of a reliability processing unit 35;

FIG. 12 is a diagram for describing the overview of update of non-moving object reliability by a reliability processing unit 35;

FIG. 13 is a diagram for describing details of update of non-moving object reliability by a reliability processing unit 35;

DETAILED DESCRIPTION OF THE EMBODIMENT(S)

Figure 1:
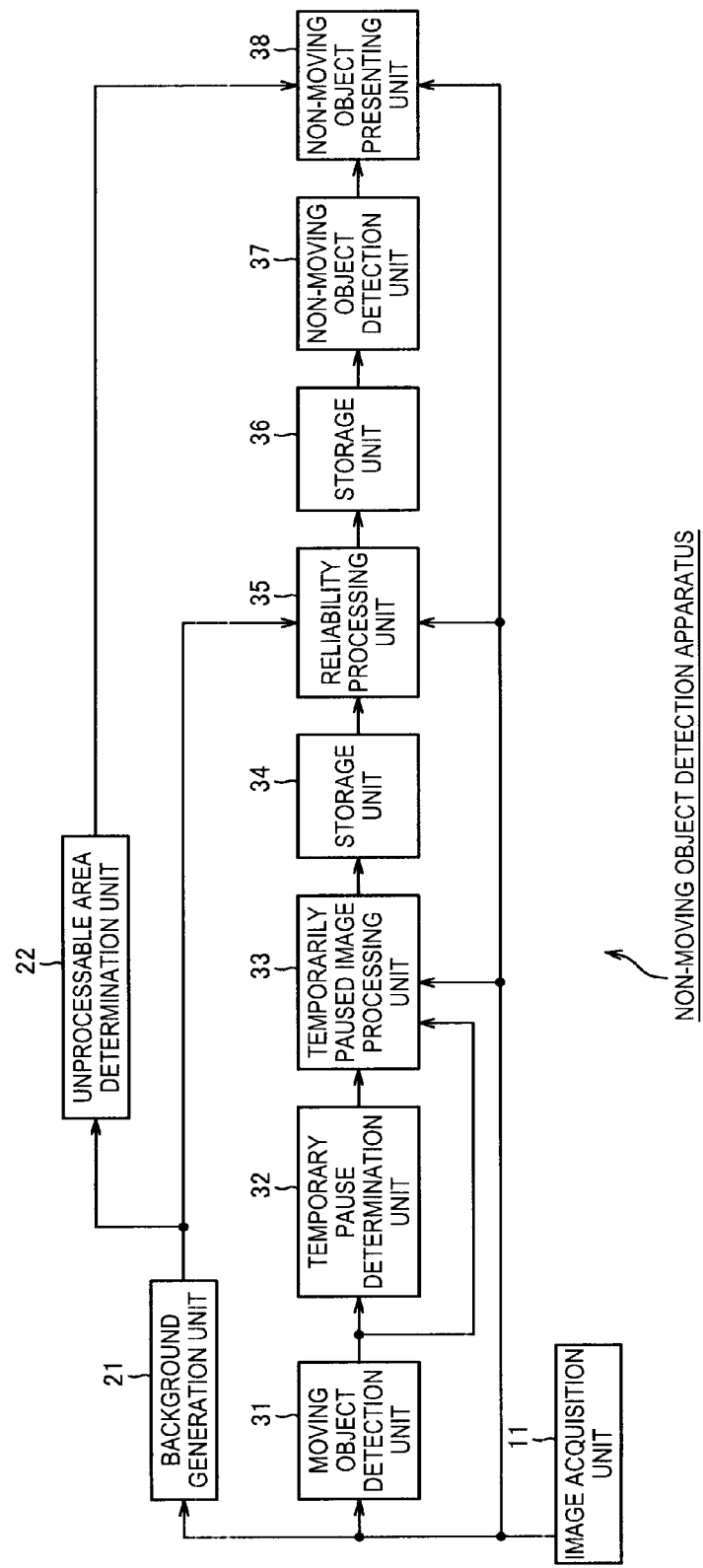
FIG. 1 is a block diagram illustrating a configuration example of an embodiment of a non-moving object detection apparatus employing the present technology.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

[Embodiment of Non-Moving Object Detection Apparatus Employing Present Technology]

FIG. 1 is a block diagram illustrating a configuration example of an embodiment of a non-moving object detection apparatus employing an image processing apparatus of the present technology.

In FIG. 1, the non-moving object detection apparatus includes an image acquisition unit 11, a background generation unit 21, a unprocessable area determination unit 22, a moving object detection unit 31, a temporary pause determination unit 32, a temporarily paused image processing unit 33, a storage unit 34, a reliability processing unit 35, a storage unit 36, a non-moving object detection unit 37, and a non-moving object presenting unit 38, and detects and presents a non-moving object.

The image acquisition unit 11 acquires and outputs an image (a moving image) of a predetermined rate. That is, the image acquisition unit 11, for example, is a camera, and captures an image at a predetermined place such as a showroom, in which a camera has been installed, at a predetermined rate, and outputs the captured image. Furthermore, the image acquisition unit 11, for example, acquires an image obtained by capturing a predetermined place from a camera (not illustrated), performs image processing of increasing the definition of the image, and outputs a high definition image.

In addition, the image acquired by the image acquisition unit 11 may be a color image or a black and white image. Here, an image acquired by the image acquisition unit 11 is assumed to be a black and white image. In this case, in the following description, the number of pixels is a luminance value.

The image output from the image acquisition unit 11 is supplied to the background generation unit 21, the moving object detection unit 31, the temporarily paused image processing unit 33, the reliability processing unit 35, and the non-moving object presenting unit 38.

The background generation unit 21 generates a background (an image) using a current image, which is the latest image supplied from the image acquisition unit 11, and the like, and supplies the generated background to the unprocessable area determination unit 22, and the reliability processing unit 35.

The unprocessable area determination unit 22 detects an area in which a background has not been generated normally, and supplies the detected area to the non-moving object presenting unit 38. The non-moving object presenting unit 38 presents the area in which the background has not been generated normally to a user.

The moving object detection unit 31 detects a moving object (an image), which is an image different from the background, in the current image from the image acquisition unit 11, and supplies the temporary pause determination unit 32 and the temporarily paused image processing unit 33 with a moving object area which is a minimal rectangular area circumscribing the moving object.

The temporary pause determination unit 32 determines whether the moving object included in the moving object area from the moving object detection unit 31 is paused for a predetermined time period or more (hereinafter also referred to as temporary pause). When it is determined that the moving object is temporarily paused, the temporary pause determination unit 32 copies an image in the moving object area of the temporarily paused moving object as a temporarily paused object reflected on a temporarily paused image on which an object which is temporarily paused (a temporarily paused object) is reflected, and supplies the image to the temporarily paused image processing unit 33.

The temporarily paused image processing unit 33 registers (stores) the temporarily paused object supplied from the temporary pause determination unit 32 in the storage unit 34. That is, the storage unit 34, for example, is a frame memory for storing a temporarily paused image, and the temporarily paused image processing unit 33 updates a pixel value of a pixel in the area of the temporarily paused object from the temporary pause determination unit 32, which is included in the image (the temporarily paused image) stored in the storage unit 34, to a pixel value of the temporarily paused object.

Furthermore, the temporarily paused image processing unit 33 updates the temporarily paused image stored in the storage unit 34 using the current image from the image acquisition unit 11 and the moving object (the moving object area) from the moving object detection unit 31. That is, the temporarily paused image processing unit 33 updates a pixel value of a pixel, which is not included in the moving object from the moving object detection unit 31, in the temporarily paused object reflected on the temporarily paused image registered (stored) in the storage unit 34 through weighted addition of the temporarily paused image (the temporarily paused object) registered in the storage unit 34 and the current image from the image acquisition unit 11.

In detail, if the pixel value of the pixel X of the image (the current image) at the time t is expressed by $I_t(X)$, a pixel value of a pixel X of the temporarily paused image stored in the storage unit 34 at the time t−1 before 1 time is expressed by $P_{t-1}(X)$, and a pixel value of a pixel X of the updated temporarily paused image obtained by the temporarily paused image processing unit 33 at the time t is expressed by $P_t(X)$, the temporarily paused image processing unit 33 calculates the pixel value $P_t(X)$ of the pixel X of the temporarily paused image (the updated temporarily paused image) at the time t with respect to the pixel of the moving object according to Equation 1 below and with respect to a pixel, which is not included in the moving object, according to Equation 2 below among pixels of the temporarily paused object reflected on the temporarily paused image stored in the storage unit 34.

$$P_t(X) = P_{t-1}(X) \quad (1)$$

$$P_t(X) = (1-\alpha')P_{t-1}(X) + \alpha I_t(X) \quad (2)$$

According to the update of the temporarily paused image according to Equation 2 above, in the state in which the luminance of the entire screen of the image acquired by the image acquisition unit 11 is changed by a variation in sunlight or illumination, it is possible to appropriately update the luminance (the pixel value) of the temporarily paused object reflected on the temporarily paused image stored in the storage unit 34 such that the luminance maximally approaches current luminance (luminance of the current image), resulting in the improvement of robustness against a variation in the luminance of an image. Consequently, it is possible to perform non-moving object detection with high accuracy.

In addition, according to Equation 1 above, a pixel value of a part of the temporarily paused object reflected on the temporarily paused image, which overlaps the moving object of the current image, is not updated (a value before update is maintained). This is for preventing the pixel value of the temporarily paused object from being overwritten (updated) on a pixel value of a pedestrian (a moving object) when the moving object, such as the pedestrian, passes the front side of the temporarily paused object.

The reliability processing unit 35 calculates non-moving object reliability for each pixel (or some adjacent pixels) of the current image using the current image from the image acquisition unit 11, the background from the background generation unit 21, and the temporarily paused image stored in the storage unit 34, and registers (stores) the non-moving object reliability in the storage unit 36, wherein the non-moving object reliability represents the likelihood of being a non-moving object, which is an image different from the background that does not change for a predetermined time period or more.

The storage unit 36 stores a reliability image in which the non-moving object reliability for each pixel of the current image from the reliability processing unit 35 is employed as a pixel value.

The non-moving object detection unit 37 detects a non-moving object from the current image based on the reliability image stored in the storage unit 36, and supplies the detected non-moving object to the non-moving object presenting unit 38.

That is, the non-moving object detection unit 37 binarizes the non-moving object reliability, which is the pixel value of the reliability image stored in the storage unit 36, using a threshold value (the non-moving object reliability equal to or more than the threshold value is set to 1 and the non-moving object reliability smaller than the threshold value is set to 0), thereby obtaining a binarized reliability image.

Moreover, the non-moving object detection unit 37 performs labeling for the binarized reliability image to attach the same label to a pixel with a pixel value of 1 between the pixel (the pixel with the non-moving object reliability equal to or more than the threshold value) with the pixel value of 1 and eight pixels adjacent to the pixel, thereby detecting a minimum rectangular area circumscribing an area including the pixel with the pixel value of 1 as an area of the non-moving object (a nor-moving object area).

Then, the non-moving object detection unit 37 analyzes (obtains) information for designating a non-moving object (area) such as the size (the number of horizontal and vertical pixels) of a rectangle as the non-moving object area, coordinates of the center or left upper point of the rectangle, and the like, and supplies the information to the non-moving object presenting unit 38 as non-moving object information.

Based on the non-moving object information from the non-moving object detection unit 37, the non-moving object presenting unit 38 presents the non-moving object (the detection purpose of the non-moving object) using the current image from the image acquisition unit 11 according to the necessity.

That is, if the non-moving object information is supplied from the non-moving object detection unit 37, the non-moving object presenting unit 38 presents (notifies) a user with (of) the detection purpose of the non-moving object through sound, an image, flicker or lighting of a lamp, and the like.

Furthermore, the non-moving object presenting unit 38 superimposes an on-screen display (OSD) of a frame, which surrounds the non-moving object area specified by the non-moving object information from the non-moving object detection unit 37, on the current image from the image acquisition unit 11, and allows the OSD to be displayed on a display apparatus (not illustrated).

In addition, only when the non-moving object (the non-moving object area) has a predetermined size SA or more, is it possible for the non-moving object presenting unit 38 to present the non-moving object. Furthermore, only when the non-moving object has the predetermined size SA or less, is it possible for the non-moving object presenting unit 38 to present the non-moving object. Moreover, only when the non-moving object has the predetermined size SA or more and has another predetermined size SB (>SA) or less, is it possible for the non-moving object presenting unit 38 to present the non-moving object. For example, the setting of the predetermined size SA or SB is possible through an operation of a user for the non-moving object detection apparatus.

Figure 2:
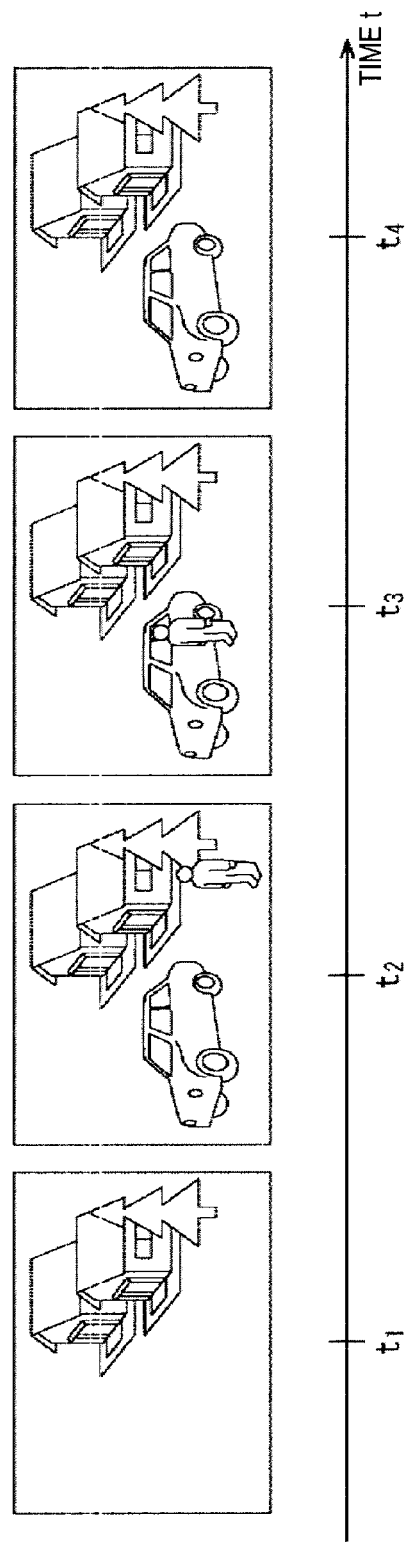
FIG. 2 is a diagram for describing the overview of a process of a non-moving object detection apparatus.

FIG. 2 is a diagram explaining the overview of the process of the non-moving object detection apparatus of FIG. 1. That is, FIG. 2 illustrates a time-series example of the image acquired by the image acquisition unit 11 of FIG. 1. In FIG. 2, on an image at a time $t_1$, houses and a tree growing near the houses are reflected.

On an image at a time $t_2$ after the time $t_1$, in addition to the houses and the tree, an automobile parked at the front of the house is reflected and a pedestrian walking from the right to the left of a screen are reflected at the time $t_2$.

On an image at a time $t_3$ after the time $t_2$, the houses, the tree, the automobile, and the pedestrian, who has moved to the left side of the screen, are reflected.

Then, at a time $t_4$ after the time $t_3$, since the pedestrian has passed through the screen, the houses, the tree, and the automobile are reflected on the image at the time $t_4$, but the pedestrian has disappeared.

In this case, in the non-moving object detection apparatus of FIG. 1, the image at the time $t_1$ is employed as a background (an image), and the automobile (an image thereof) parked from the time $t_2$ and different from the background is detected as a non-moving object. Furthermore, in the non-moving object detection apparatus of FIG. 1, since the pedestrian corresponds to a moving object that moves by walking, the pedestrian is not detected as the non-moving object.

As described above, in the non-moving object detection apparatus of FIG. 1, a part not changed for a predetermined time period or more and different from the background in the image is detected as the non-moving object.

Thus, in the non-moving object detection apparatus of FIG. 1, for example, as illustrated in FIG. 2, in the case in which the image including the houses and the tree at the time $t_1$ is a background, when the automobile has been parked at the front of the house and has been left behind, the automobile is detected as the non-moving object. In addition, for example, in the case in which the image including the houses, the tree, and the parked automobile at the time $t_4$ is a background, when the parked automobile has been left behind, the automobile (a part including the automobile) is detected as the non-moving object.

[Background Generation Unit 21]

FIG. 3A is a diagram illustrating an example of a background model generated by the background generation unit 21. In the background model illustrated in FIG. 3A, a horizontal axis denotes a luminance value and a vertical axis denotes a weight (appearance frequency). The background model illustrated in FIG. 3A is an example obtained by modeling a background in a trinomial distribution. Here, the trinomial distribution will be described as an example. However, the present technology is not limited to the trinomial distribution. For example, the present technology can also be applied to a multinomial distribution. Furthermore, the trinomial distribution has three peaks as illustrated in FIG. 3A, wherein a first term, a second term, and a third term are appropriately written from the left side.

The background model illustrated in FIG. 3A is created in a temporal direction of a predetermined pixel. As illustrated in FIG. 3B, each distribution includes three indexes of an average luminance value, a weight, and a range. A horizontal axis of one distribution denotes a predetermined range about the average luminance value. The appearance frequency of a luminance value in the range is represented as a height of one distribution. The range about the average luminance value will be continuously described as a fixed value, and the same range will be continuously described to be used in each distribution. However, a variable value may be used, or different ranges may be used in each distribution.

Furthermore, it is possible to allow each term to have dispersion and the like, for example, a parameter necessary to be known in background creation technique using a so-called mixture normal distribution, and a range regarded as the same distribution may be used as a parameter changed according to the range.

The generation of the background model will be described. First, the image acquisition unit 11 acquires an image photographed by a photographing apparatus such as a camera, or an image such as an input signal from another reproduction device. The acquired image is subject to signal processing such as image noise removal or resolution enhancement processing according to necessity, and then is supplied to the background generation unit 21.

The background generation unit 21 performs background modeling by analyzing the supplied time-series image signal. In each pixel at the time of estimation of the background, the background model of the multinomial distribution illustrated in FIG. 3 is created. For the generation in each pixel, for example, background models are generated from luminance values of 100 pixels at the time point at which 100 frames have been processed. Furthermore, when ore frame includes 100 pixels, 100 background models as illustrated in FIG. 3 are generated in each pixel.

Figure 4:
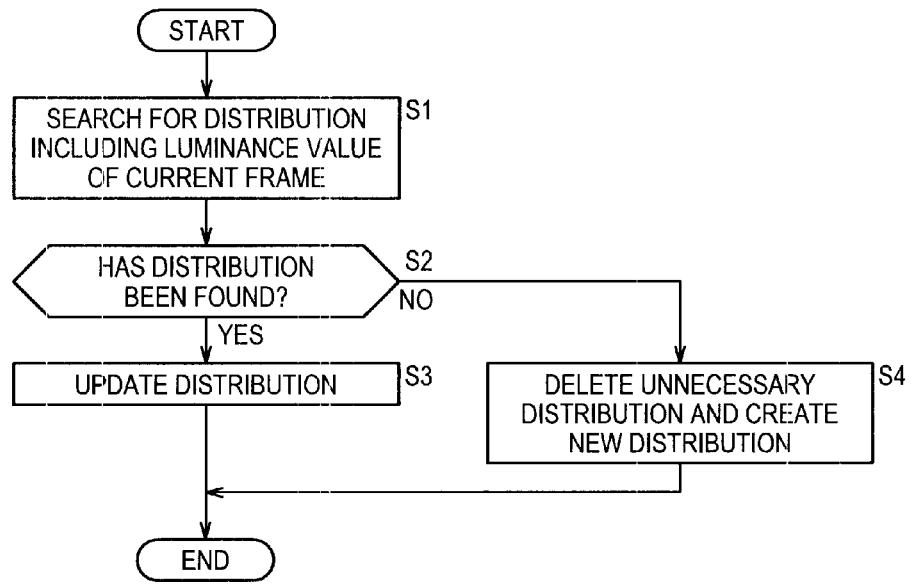
FIG. 4 is a flowchart for describing the generation of a background model.

With reference to the flowchart of FIG. 4, the background model generation performed by the background generation unit 21 will be described. In step S1, a desired distribution including a luminance value (a luminance value of a pixel at a predetermined coordinate to be processed) of a current frame is searched for. First, a distribution in which the luminance value of the current frame is nearest an average luminance value is obtained from distributions, it is determined whether the luminance value of the current frame is included in the range of the obtained distribution, and the obtained distribution is the desired distribution when the luminance value of the current frame is included in the range. As a result of the search, whether the desired distribution including the luminance value of the current frame has been found is determined in step S2.

It is assumed that a frame has already been processed and the background model illustrated in FIG. 3A has been created. A current luminance value may be a luminance value within a predetermined distribution as illustrated in FIG. 5A, or a luminance value out of the predetermined distribution as illustrated in FIG. 5B. As illustrated in FIG. 5A, when the current luminance value is the luminance value within the predetermined distribution, it is determined that the desired distribution has been found in step S2, and the process of step S3 is performed.

Figure 6:
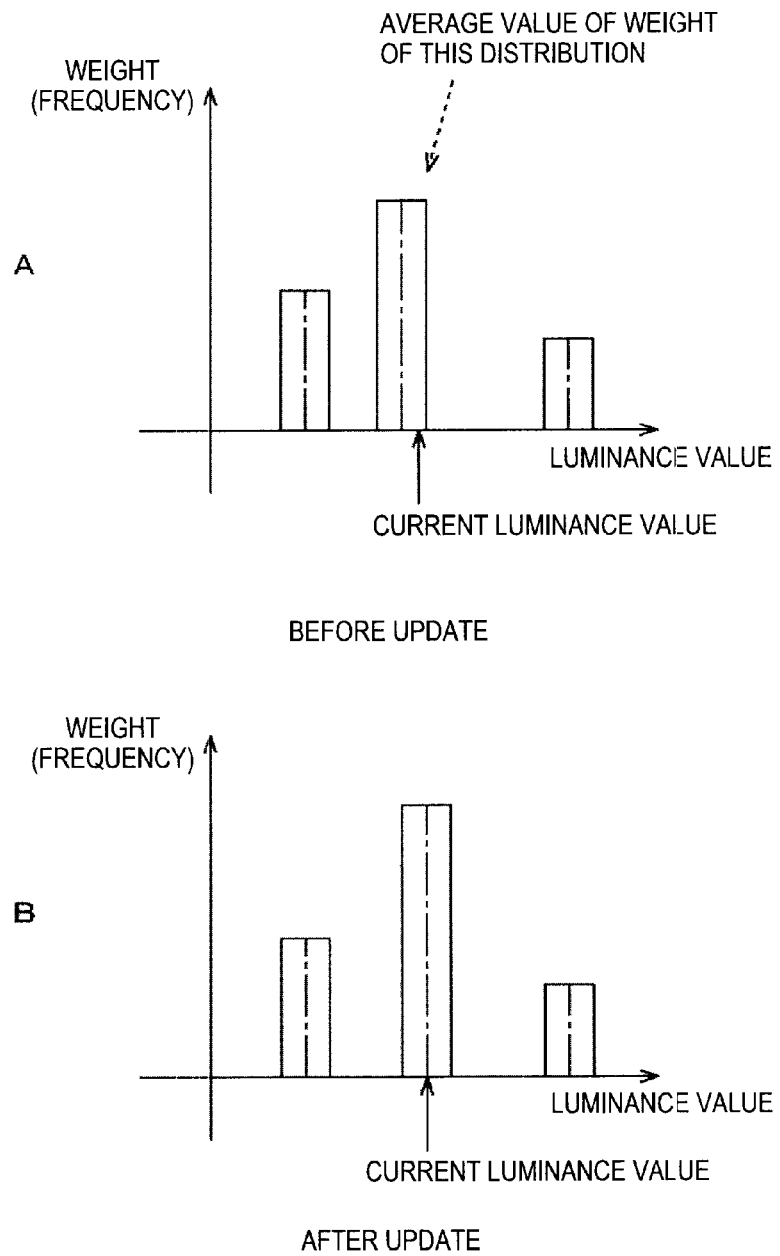
FIG. 6 is a diagram for describing a background model.

In step S3, the distribution including the current luminance value is updated. With reference to FIG. 6, this update will be described. FIG. 6A uses the same background model as in FIG. 5A, and illustrates the case in which the current luminance value is included in a distribution of a second term. In this case, an average luminance value and a weight (frequency) of the distribution of the second term are updated. FIG. 6B illustrates a background model after the update. As illustrated in FIG. 6B, it can be understood that the frequency of the distribution of the second term after the update is increased as compared with the frequency of the distribution of the second term before the update illustrated in FIG. 6A. Furthermore, the current luminance value is positioned at the right end of the distribution of the second term before the update illustrated in FIG. 6A, but is positioned at an approximate center (an approximate average luminance value) of the distribution of the second term after the update illustrated in FIG. 6B.

The average luminance value is updated based on Equation 3 below. That is, if a pixel value of a pixel (hereinafter, also referred to as a pixel X) of a position X of an image (the current image) at a time t is expressed by $I_t(X)$, a pixel value of a pixel X of a background generated by the background generation unit 21 at a time t−1 1 time before is expressed by $B_{t-1}(X)$, and a pixel value of a pixel X of a background generated by the background generation unit 21 at a time t is expressed by $B_t(X)$, the background generation unit 21, for example, calculates the pixel value $B_t(X)$ of the pixel X of the background at the time t according to Equation 3 below.

$$B_t(X)=(1-\alpha)B_{t-1}(X)+\alpha I_t(X) \quad \text{Equation 3}$$

In Equation 3 above, the coefficient α denotes values in the range of 0<α<1.0.

According to Equation 3 above, the background generation unit 21 (approximately) equivalently obtains the background through weighted addition of an image for a time ΔT from a past time t−ΔT+1 to a current time t, and the background model as illustrated in FIG. 6 is generated in each pixel.

The background obtained according to Equation 3 above is updated with a long period if the coefficient α becomes small. That is, in the case in which the coefficient α of Equation 3 above has a small value, even when a variation occurs in the image, if the state of the image after the variation is not continued for a long time, the coefficient α is not reflected in the background.

Furthermore, the background obtained according to Equation 3 above is updated with a short period if the coefficient α becomes large. That is, in the case in which the coefficient α of Equation 3 above has a large value, when a variation occurs in the image, if the state of the image after the variation is continued for a short time, the coefficient α is reflected in the background.

When an object having not moved for at least a time m is detected as a non-moving object, if the time m is defined as a non-moving object recognition time m, it is preferable that an update period of the background generated by the background generation unit 21 be longer than the non-moving object recognition time m, for example, about five times as long as the non-moving object recognition time m.

That is, even when a variation occurs in the image, if the state of the image after the variation is continued only for a time corresponding to about five times the non-moving object recognition time m, the coefficient α is set as a value which is reflected in the background.

Here, the non-moving object recognition time m, for example, can be set by a user operating the non-moving object detection apparatus of FIG. 1, and the background generation unit 21 sets the coefficient α according to the non-moving object recognition time m.

In addition, a background generation method of the background generation unit 21 is not limited to the method using Equation 3 above. That is, it is possible for the background generation unit 21 to employ a method for creating a background using a Gaussian mixture model (weighted mixture normal distribution), and the like.

The average luminance value is updated based on Equation 3 above.

The degree (frequency) is updated based on Equation 4 below. If frequency before the update is expressed by Ws(t,X) and frequency after the update is expressed by Ws(t+1,X), the degree is calculated as in Equation 4 below.

$$Ws(t+1,X)=Ws(t,X)+(N-1) \quad \text{Equation 4}$$

In Equation 4 above, N denotes the number of terms. Here, since a trinomial distribution is described as an example, N is 3.

In addition, the frequency is calculated based on Equation 4 above. In this case, the part of (N−1) is a fixed value of 2 (=3−1). However, the fixed value may be numerical values other than "2." For example, the fixed value may be "1."

In step S3, when the distribution is updated, the number of updates is also stored. The number of updates is an accumulation of the number of processed frames.

As described above, when a luminance value of a pixel in a current frame to be processed is within a distribution of the already created background model, the frequency and average luminance value of the distribution are updated. Meanwhile, when it is determined that the desired distribution including the luminance value of the current frame to be processed has not been found in step S2, the process of step S4 is performed.

Figure 7:
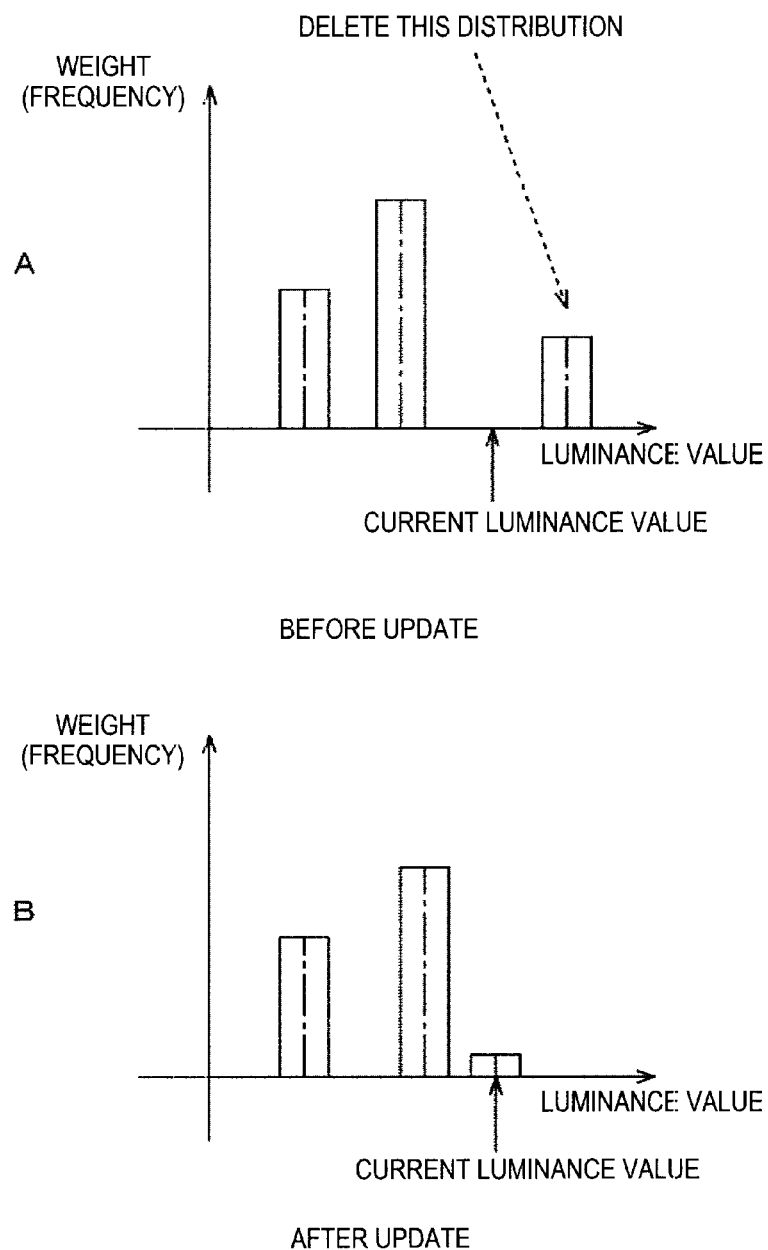
FIG. 7 is a diagram for describing a background model.

In step S4, unnecessary distributions are deleted and a new distribution is created. The process of step S4 will be described with reference to FIG. 7. FIG. 7A uses the same background model as in FIG. 5A, and illustrates the case in which the current luminance value is included between a distribution of a second term and a distribution of a third term. When a distribution including the current luminance value is not a background model, a distribution with the lowest weight (frequency) is searched from background models at that time and is deleted.

In the example illustrated in FIG. 7A, since the weight of the distribution of the third term is the lowest, the distribution of the third term is deleted. Then, a distribution which employs the current luminance value as an average luminance value is newly created. As described above, a background model after the deletion and creation of the distribution are performed (updated) is illustrated in FIG. 7B. As illustrated in FIG. 7B, after the distribution of the third term is deleted, a distribution which employs the current luminance value as an average luminance value and has a predetermined range with the average luminance value at a center thereof is newly created as the distribution of the third term.

The weight of the newly created distribution is set to have the same value as that of (N−1) in Equation 4 above. As described above, when N is 3, the weight of the newly created distribution is 2. Furthermore, when (N−1) is a fixed value of "1," the weight is set as the fixed value. In addition, the weight at the time of the update and the weight at the time of the new creation are not limited to the same value. For example, the weights may be set as different values.

As described above, a background model is generated in each pixel and is supplied to the unprocessable area determination unit 22 and the reliability processing unit 35 as a background (an image).

[Moving Object Detection Unit 31]

Figure 8:
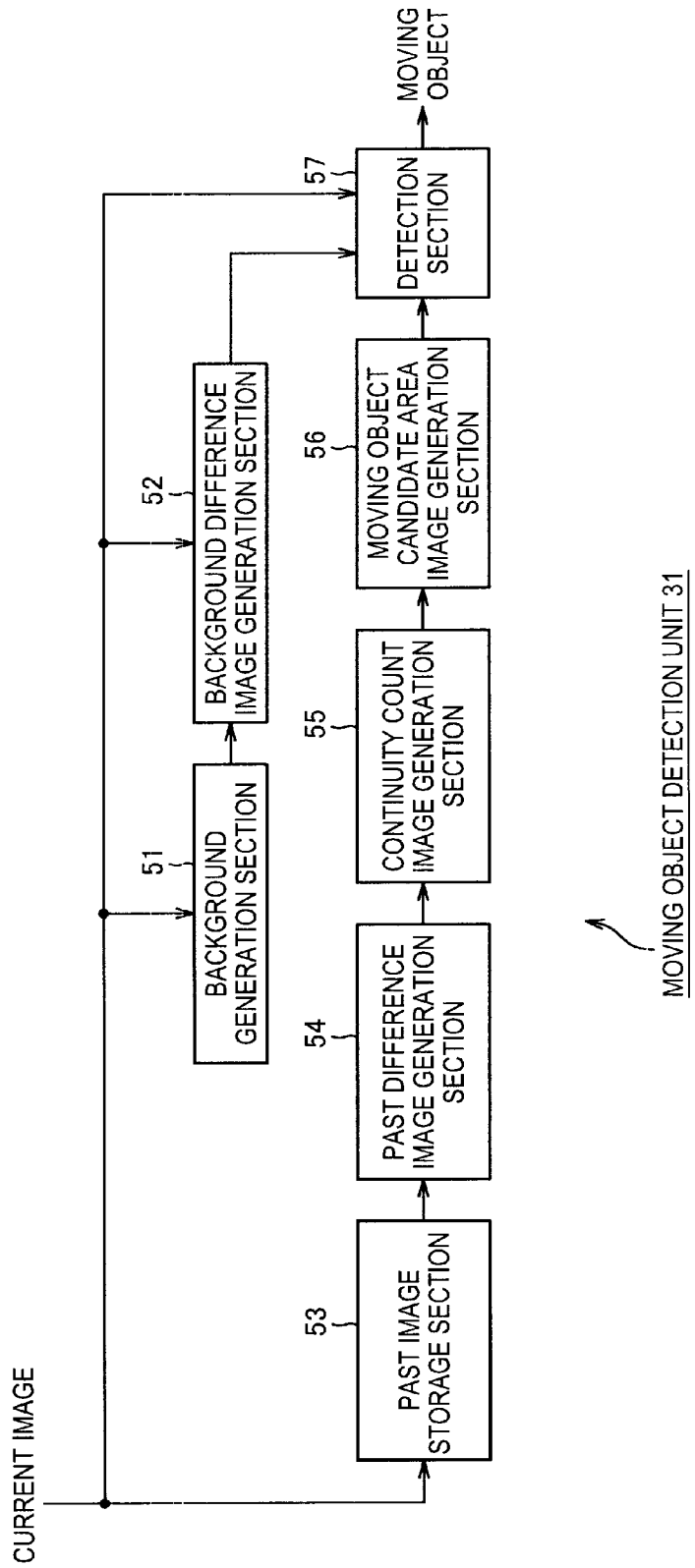
FIG. 8 is a block diagram illustrating a configuration example of a moving object detection unit 31.

FIG. 8 is a block diagram illustrating a configuration example of a moving object detection unit 31 shown in FIG. 1. In FIG. 8, the moving object detection unit 31 includes a background generation section 51, a background difference image generation section 52, a past image storage section 53, a past difference image generation section 54, a continuity count image generation section 55, a moving object candidate area image generation section 56, and a detection section 57, and detects a moving object different from a background from the current image from the image acquisition unit 11 (FIG. 1), wherein the moving object includes an object which is moving, an object which is paused only for a short time, and the like.

Here, the moving object detection unit 31 of FIG. 8, for example, detects the moving object using a method disclosed in Japanese Unexamined Patent Application Publication No. 2006-107457. However, a moving object detection method of the moving object detection unit 31 is not specifically limited thereto.

In FIG. 8, the current image from the image acquisition unit 11 is supplied to the background generation section 51, the background difference image generation section 52, the past image storage section 53, and the detection section 57.

The background generation section 51, for example, generates a background using the current image from the image acquisition unit 11 according to Equation 3 above, similarly to the background generation unit 21 of FIG. 1, and supplies the background to the background difference image generation section 52.

In addition, in order to suppress erroneous detection of a moving object, the background generation section 51 generates a background which is updated with a short period as compared with the background generated by the background generation unit 21 of FIG. 1. That is, if the update period of the background generated by the background generation unit 21 of FIG. 1, for example, is one hour, the background generation section 51, for example, generates a background which is updated with a period of about 15 seconds.

Thus, the background generation section 51 sets a value, which is larger than the value used in the background generation unit 21 of FIG. 1, as the coefficient α of Equation 3 above.

Here, the background generation section 51 generates, as a background, an image in which a moving object (display thereof) reflected on the current image has been suppressed and has paused for a predetermined time period.

Meanwhile, in order to detect a non-moving object not changed for a predetermined time period or more such as three minutes and different from a background, the background generation unit 21 of FIG. 1, for example, generates an image in a pause state for a sufficiently long time, as compared with a minimum desired time (the above-mentioned three minutes and the like) for which the non-moving object is not changed, as a background.

In addition, it is possible for the background generation section 51 to generate a background which is updated with the same period as that of the background generated the background generation unit 21 of FIG. 1. In this case, it is sufficient if only one of the background generation units 21 and 51 is provided in the non-moving object detection apparatus.

The background difference image generation section 52 generates a background difference image in which an absolute value of a difference of pixel values of pixels between the current image from the image acquisition unit 11 and the background from the background generation section 51 is employed as a pixel value, and supplies the background difference image to the detection section 57.

Meanwhile, the past image storage section 53 sequentially stores images which are supplied from the image acquisition unit 11 as current images, thereby storing images for N+1 time period back to the past from the present, that is, a current image at the latest time (the current time) t and past images from times t−N to t−1

The image (the current time) at the time t and the images (the past images) from times t−N to t−1 stored in the past image storage section 53 are supplied to the past difference image generation section 54.

The past difference image generation section 54 generates past difference images in which difference values of pixel values of pixels between the current image and the past images at each time t−n (n=1, 2, ..., N) are employed as pixel values, and supplies the past difference images to the continuity court image generation section 55.

The continuity count image generation section 55 performs counting for pixels of the N past difference images obtained from the past images at times t−N, t−(N+1), ..., t−1 in order to determine the continuity of the pixel values (the difference values), generates continuity count images in which count values are employed as pixel values, and supplies the continuity count images to the moving object candidate area image generation section 56.

The moving object candidate area image generation section 56 binarizes the continuity count images (pixel values of pixels thereof) from the continuity count image generation section 55 using a threshold value, generates a moving object candidate area image in which candidate pixel values of pixels including a moving object are set to 1 and pixel values of other pixels are set to 0, and supplies the moving object candidate area image to the detection section 57.

The detection section 57 detects an area of the current image including a moving object in the current image based on the background difference image from the background difference image generation section 52 and the moving object candidate area image from the moving object candidate area image generation section 56.

Moreover, the detection section 57 copies an image of a minimum rectangular circumscribing area, which surrounds an area in which the moving object has been reflected, as a moving object area from the current image from the image acquisition unit 11, and supplies the moving object area to the temporary pause determination unit 32 and the temporarily paused image processing unit 33 of FIG. 1.

FIG. 9 is a diagram explaining a moving object detection principle of the moving object detection unit 31 of FIG. 8. That is, FIGS. 9A, 9B, and 9C illustrate examples of a pixel value (a difference value between the pixel values of the current image and the past image) of a pixel X of N past difference images in which difference values of pixel values of pixels between the current image and the past images at times t−N, t−(N+1), ..., t−1 are employed as pixel values.

In addition, in FIGS. 9A, 9B, and 9C, a horizontal axis denotes a time of a past image used in order to obtain the past difference image, and a vertical axis denotes the pixel value (the difference value of the pixel values of the current image and the past images) of the pixel X of the past difference image.

When a moving object has not been reflected on the pixel X of each image at times t−N to t, a relatively small value is continued as the pixel value (the difference value) of the pixel X of the N past difference images as illustrated in the top diagram of FIG. 9A.

Meanwhile, at a time t' of the times t−N to t, when the moving object starts to be reflected on the pixel X and is reflected on the pixel X in the current image, a relatively large value is continued as the pixel value (the difference value) of the pixel X of the past difference image before the time t' and the pixel value (the difference value) of the pixel X of the past difference image after the time t' is a relatively small value as illustrated in the middle diagram of FIG. 9B.

Furthermore, when leaves or grains of a tree have been reflected on the pixel X of the image at the times t−N to t and have been shaken, the pixel value (the difference value) of the pixel X of the N past difference images is changed to a large value or a small value as illustrated in the bottom diagram of FIG. 9C.

Thus, the pixel value (the difference value) of the pixel X of the N past difference images is binarized using a threshold value, and a pixel having a pixel value exceeding the threshold value and continued for a predetermined time period is detected as a pixel on which a moving object has been reflected, so that it is possible to prevent shaking of leaves or grains of a tree or disturbance such as a variation in luminance due to a sudden variation in sunlight from being erroneously detected (erroneous detection) as a moving object.

In this regard, in the moving object detection unit 31 of FIG. 8, the continuity count image generation section 55 performs counting for the pixels of the N past difference images obtained from the past images at the times t−N, t−(N+1), ..., t−1 in order to calculate the number of times (the number of the past difference images) by which the pixel value continuously exceeds the threshold value, generates the continuity count images in which the count values are employed as pixel values, and supplies the continuity count images to the moving object candidate area image generation section 56.

Here, as described with reference to FIG. 8, the moving object candidate area image generation section 56 generates the moving object candidate area image obtained by binarizing the pixel values of the pixels of the continuity count images from the continuity count image generation section 55 using the threshold value.

When the moving object has been reflected on the pixel X, since a relatively large value is continued as the pixel value (the difference value) of the pixel X of the N past difference images and the pixel value of the pixel X of the continuity count image exceeds the threshold value, the pixel of the continuity count image having a pixel value exceeding the threshold value is detected, that is, a pixel of the moving object candidate area image having a pixel value of 1 is detected, so that it is possible to detect the moving object (the pixel on which the moving object has been reflected).

Meanwhile, when an object has moved from a position X to a position Y, all pixel values of pixels X and Y of the continuity count image exceed the threshold value. Thus, when the pixel of the moving object candidate area image having a pixel value of 1 is detected as the moving object, both the pixels X and Y are detected as the moving object.

However, when the object has moved from the position X to the position Y, the moved object is reflected on the pixel Y in the current image, but is not reflected on the pixel X because the object has passed by the pixel X.

Thus, when the object has moved from the position X to the position Y, at the time of detection of the moving object from the current image, the pixels X and Y are not both detected as the moving object. That is, the pixel Y including the moved object in the current image is detected as the moving object, and the pixel X not including the moved object in the current image is not detected as the moving object.

In this regard, among pixels of the moving object candidate area image having a pixel value of 1, the moving object detection unit 31 of FIG. 8 detects only a pixel including a moved object after movement in the current image as the moving object (does not detect a pixel including an object before movement in the current image as the moving object).

That is, as described above, in the moving object detection unit 31 of FIG. 8, the background difference image generation section 52 generates the background difference image in which the absolute value of the difference of the pixel values of the pixels between the current image from the image acquisition unit 11 and the background from the background generation section 51 is employed as the pixel value, and supplies the background difference image to the detection section 57.

Since the pixel value (the absolute value of the difference) of the background difference image becomes large in a pixel different in the current image and the background, that is, becomes large in a pixel of an object not reflected on the background but reflected on the current image, the background difference image (the pixel value of each pixel thereof) is binarized using the threshold value, so that it is possible to obtain an image (hereinafter, also referred to as a binarized background difference image) in which the pixel of the object not reflected on the background but reflected on the current image has a pixel value of 1, and another pixel has a pixel value of 0.

Since the pixel of the object not reflected on the background but reflected on the current image has a pixel value of 1 in the binarized background difference image, a pixel having a pixel value of 1 both in the binarized background difference image and the moving object candidate area image is detected, so that it is possible to detect only a pixel including an object after movement in the current image as the moving object.

As described above, the detection section 57 detects only a pixel of the current image including an object after movement as the moving object based on the background difference image (the binarized background difference image obtained) from the background difference image generation section 52 and the moving object candidate area image from the moving object candidate area image generation section 56.

In the moving object detection unit 31 as described above, when an object not in the background has appeared (for example, when an object has been left behind), a part including the object in the current image is detected as the moving object. However, when an object existing in the background has disappeared (for example, when an object has been carried away), a part including the object existing in the background in the current image is detected as the moving object.

[Temporary Pause Determination Unit 32]

Figure 10:
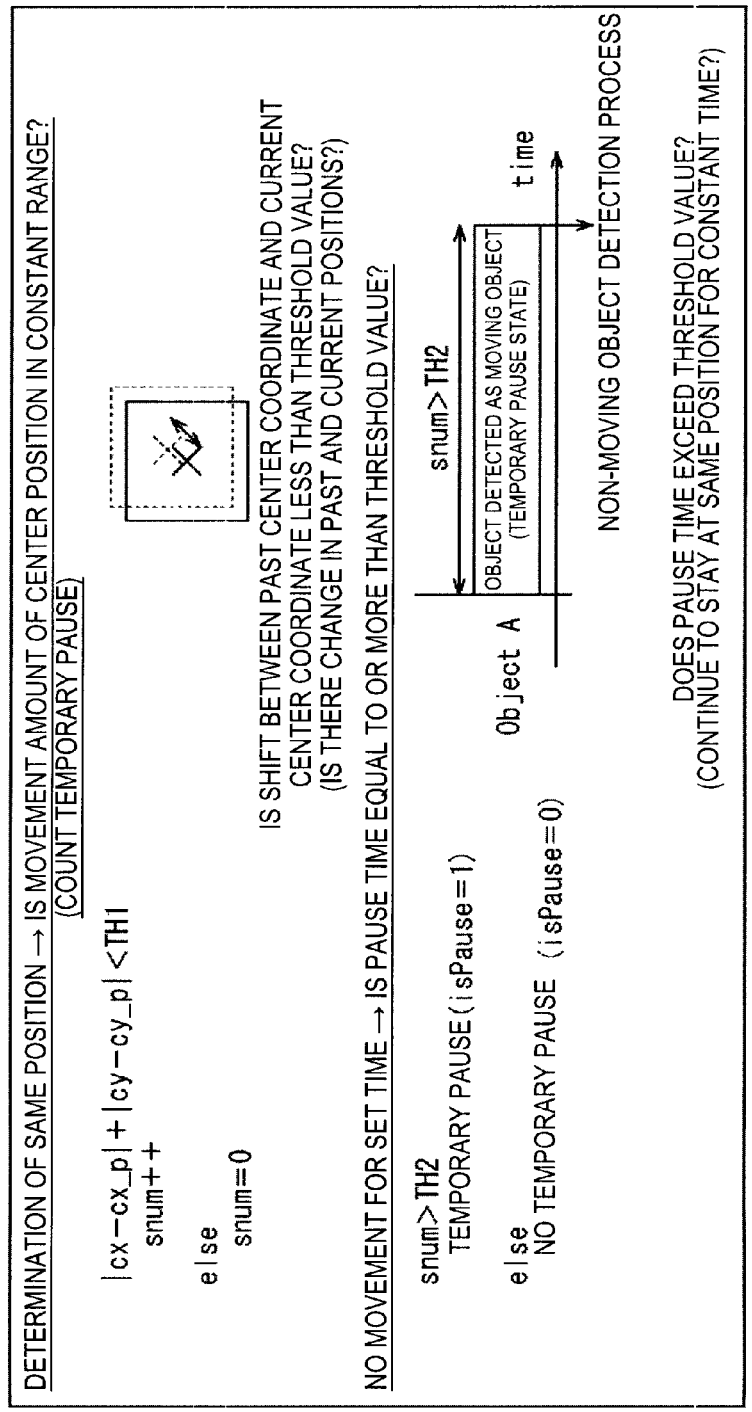
FIG. 10 is a diagram for describing a process of a temporary pause determination unit 32.

FIG. 10 is a diagram explaining the process of the temporary pause determination unit 32 of FIG. 1. The temporary pause determination unit 32 determines whether the moving object (included in the moving object area) from the moving object detection unit 31 is paused for a predetermined time period or more (temporarily paused).

The determination regarding whether the moving object is temporarily paused includes pause state determination regarding whether the moving object is in a pause state, and continuous determination regarding whether the pause state is continued for a predetermined time period (equal to or slightly shorter than the above-mentioned non-moving object recognition time m) or more.

That is, by tracking the moving object detected by the moving object detection unit 31, the temporary pause determination unit 32 performs the pause state determination using the moving object detected from the image (the current image) at the time t and a moving object detected from the image at the time t−1 before 1 time, which is the same as the above moving object.

In the pause state determination, it is determined whether a position shift amount between the moving object detected from the current image and, for example, a moving object detected from an image before a time (a past time), such as the time t−1. is smaller than a threshold value TH1 of the position shift amount.

For example, if a coordinate (a position) of the center of a rectangular moving object area of the moving object detected from the current image is expressed by (cx, cy) and a coordinate (a position) of the center of a rectangular moving object area of the moving object detected from the image at the time t−1 is expressed by (cx_p, cy_p), the position shift amount, for example, may be expressed as |cx−cx_p|+|cy−cy_p|.

In this case, in the pause state determination, it is determined whether |cx−cx_p|+|cy−cy_p|<TH1 is satisfied.

When the position shift amount between the moving object detected from the current image and the moving object detected from the image at the time t−1 is smaller than the threshold value TH1 of the position shift amount, a variable snum for counting that the moving object is continuously in the pause state is incremented by 1.

Furthermore, when the position shift amount between the moving object detected from the current image and the moving object detected from the image at the time t−1 is not smaller than the threshold value TH1 of the position shift amount, the variable snum is reset to 0.

In the continuous determination, it is determined whether the variable snum is larger than (equal to or more than) a threshold value TH2 of a time corresponding to a predetermined time period.

When the variable snum is larger than the threshold value TH2, it is determined that the moving object detected from the current image is temporarily paused (is in the temporary pause state). When the variable snum is not larger than the threshold value TH2, it is determined that the moving object detected from the current image does not temporarily pause (is not in the temporary pause state).

As described above, when the fact that the position shift amount between the moving object detected from the current image and the moving object detected from the image before 1 time of the current image is less than the threshold value TH1 is continued for the threshold value TH2 or more of the time, the temporary pause determination unit 32 determines that the moving object detected from the current image temporarily is paused for a predetermined time period or more, that is, is in the temporary pause state.

If it is determined that the moving object detected from the current image is temporarily paused for a predetermined time period or more, that is, is in the temporary pause state, the temporary pause determination unit 32 assigns a temporary pause flag is Pause to the moving object, wherein the temporary pause flag is Pause has a value of 1 indicating the temporary pause state.

Then, the temporary pause determination unit 32 supplies the temporarily paused image processing unit 33 with the moving object, to which the temporary pause flag is Pause having a value of 1 has been assigned, as a temporarily paused object which is temporarily paused.

The temporarily paused image processing unit 33 registers (stores) the temporarily paused object supplied from the temporary pause determination unit 32 in the temporarily paused image stored in the storage unit 34 in the form of overwriting.

In addition, a person (a human being) may be excluded from an object to be detected as the temporarily paused object, or as a non-moving object. From the experience of present inventor, since luminance changes for a relatively short time with respect to a person, if the moving object detected from the current image is a moving object in which luminance changes for a relatively short time, even when the temporary pause determination unit 32 determines that the moving object is temporarily paused, the moving object is not set as the temporarily paused object (is not registered in the storage unit 34), so that it is possible to prevent a person from being detected as the non-moving object.

[Reliability Processing Unit 35]

FIG. 11 is a diagram explaining the process of the reliability processing unit 35 of FIG. 1. As described with reference to FIG. 1, the reliability processing unit 35 calculates the non-moving object reliability for each pixel of the current image using the current image from the image acquisition unit 11, the background from the background generation unit 21, and the temporarily paused image stored in the storage unit 34, and registers (stores) the non-moving object reliability in the storage unit 36.

Here, as illustrated in FIG. 11, houses, a tree, an automobile, and a pedestrian are assumed to be reflected on the current image. Furthermore, in FIG. 11, it is assumed that the houses and the tree reflected on the current image are a background, the automobile is a non-moving object, and the pedestrian is a moving object, which is a moving object.

In this case, as illustrated in FIG. 11, the storage unit 34 stores a temporarily paused image on which the automobile serving as the non-moving object is reflected as a temporarily paused object.

When paying attention to a pixel (hereinafter, also referred to as a non-moving object pixel) X of the current image on which the automobile serving as the non-moving object is reflected, a pixel value I of the non-moving object pixel (a pixel of a position X) X of the current image and a pixel value P of the non-moving object pixel (the pixel of the position X) X of the temporarily paused image are equal (coincide or approximately coincide).

Furthermore, the pixel value P of the non-moving object pixel X of the temporarily paused image and a pixel value B of the non-moving object pixel (the pixel of the position X) X of the background are not equal.

Moreover, the pixel value I of the non-moving object pixel X of the current image and the pixel value B of the non-moving object pixel X of the background are not equal.

Meanwhile, when paying attention to the background of the current image, for example, a pixel (hereinafter, also referred to as a background pixel) X' on which the house is reflected, a pixel value I of the background pixel X' of the current image and a pixel value P of the back ground pixel X' of the temporarily paused image are not equal.

Moreover, the pixel value P of the background pixel X' of the temporarily paused image and a pixel value B of the background pixel X' of the background are not equal. However, the pixel value I of the background pixel X' of the current image and the pixel value B of the background pixel X' of the background are equal.

Meanwhile, when paying attention to a pixel (hereinafter, also referred to as a moving object pixel) X" on which the pedestrian serving as the moving object of the current image is reflected, a pixel value I of the moving object pixel X" of the current image and a pixel value P of the moving object pixel X" of the temporarily paused image are not equal.

Moreover, the pixel value P of the moving object pixel X" of the temporarily paused image and a pixel value B of the moving object pixel X" of the background are not equal, and the pixel value I of the moving object pixel X" of the current image and the pixel value B of the moving object pixel X" of the background are not equal.

This is also the same when the pedestrian serving as the moving object is in the front of the automobile serving as the non-moving object and the moving object pixel of the current image is a pixel on which the moving object is reflected as illustrated in FIG. 11.

As described above, since a magnitude relation among the pixel values of the pixels of the positions X of the current image, the temporarily paused image, and the background is changed according to whether the pixel of the position X of the current image is the non-moving object pixel, the background pixel, or the moving object pixel, it is possible to estimate non-moving object reliability representing the likelihood of the pixel of the position X of the current image being the non-moving object pixel, based on the magnitude relation.

In this regard, the reliability processing unit 35 calculates the non-moving object reliability for each pixel (pixels of each position X) X of the current image based on the magnitude relation among the pixel values of the pixels X of the current image, the background, and the temporarily paused image.

For example, when the non-moving object detection apparatus of FIG. 1 is powered on, the reliability processing unit 35 resets each pixel value of the reliability image (the image in which the non-moving object reliability is employed as the pixel value) stored in the storage unit 36, for example, to 0.

Then, if a temporarily paused object is newly registered (stores) in the storage unit 34, that is, if a new temporarily paused object is obtained from the current image, the reliability processing unit 35 sets an initial value $C_0$ of the non-moving object reliability (stores (registers) the initial value $C_0$ in the storage unit 36) in each pixel constituting the new temporarily paused object of the reliability image stored in the storage unit 36.

Moreover, the reliability processing unit 35 determines whether each pixel of the current image is the non-moving object pixel whenever a new current image is obtained (in each frame), and updates the non-moving object reliability, which corresponds to the pixel value of the reliability image stored in the storage unit 36, based on a result of the determination.

That is, FIG. 12 is a diagram explaining an overview of the update of the non-moving object reliability by the reliability processing unit 35. It is assumed that the pixel value of the pixel of the position X of the current image is expressed by I(X), the pixel value of the pixel of the position X of the temporarily paused image is expressed by P(X), and the pixel value of the pixel of the position X of the background is expressed by B(X).

As described with reference to FIG. 11, when the pixel of the position X of the current image is the non-moving object pixel, the pixel value I(X) and the pixel value P(X) are equal, the pixel value P(X) and the pixel value B(X) are not equal, and the pixel value I(X) and the pixel value B(X) are not equal.

Furthermore, when the pixel of the position X of the current image is the background pixel, the pixel value I(X) and the pixel value P(X) are not equal to each other, the pixel value P(X) and the pixel value B(X) are not equal to each other, and the pixel value I(X) and the pixel value B(X) are equal to each other.

Moreover, when the pixel of the position X of the current image is the moving object pixel, the pixel value I(X) and the pixel value P(X) are not equal, the pixel value P(X) and the pixel value B(X) are not equal, and the pixel value I(X) and the pixel value B(X) are not equal.

In this regard, when an absolute value $|I(X)-P(X)|$ of a difference between the pixel value I(X) and the pixel value P(X) is smaller than a threshold value th, an absolute value $|I(X)-B(X)|$ of a difference between the pixel value I(X) and the pixel value B(X) is equal to or more than the threshold value th, and an absolute value $|B(X)-P(X)|$ of a difference between the pixel value B(X) and the pixel value P(X) is equal to or more than the threshold value th as illustrated in FIG. 12A, since it is highly probable that the pixel (the pixel of the position X) X of the current image is the non-moving object pixel, the reliability processing unit 35 sets an update amount $\Delta C(X)$ of non-moving object reliability C(X) for the pixel X to, for example, +1, and updates the non-moving object reliability C(X) according to Equation $C(X)=C(X)+\Delta C(X)$ (increments the non-moving object reliability C(X)).

Moreover, when the absolute value $|I(X)-P(X)|$ of the difference between the pixel value I(X) and the pixel value P(X) is equal to or more than the threshold value th, an absolute value $|P(X)-B(X)|$ of a difference between the pixel value P(X) and the pixel value B(X) is equal to or more than the threshold value th, and an absolute value $|B(X)-I(X)|$ of a difference between the pixel value B(X) and the pixel value I(X) is smaller than the threshold value th, or when the absolute value $|I(X)-P(X)|$ of the difference between the pixel value I(X) and the pixel value P(X) is smaller than the threshold value th, the absolute value $|P(X)-B(X)|$ of the difference between the pixel value P(X) and the pixel value B(X) is smaller than the threshold value th, and the absolute value $|B(X)-I(X)|$ of the difference between the pixel value B(X) and the pixel value I(X) is smaller than the threshold value th as illustrated in FIG. 12B, since it is highly probable that the pixel X of the current image is the background pixel, the reliability processing unit 35 sets the update amount $\Delta C(X)$ of the non-moving object reliability C(X) for the pixel X to, for example, −1, and updates the non-moving object reliability C(X) according to an equation $C(X)=C(X)+\Delta C(X)$ (decrements the non-moving object reliability C(X)).

Here, in the present embodiment, since the temporarily paused object stored in the storage unit 34 has a rectangular shape, a part of the temporarily paused object may include a background. In the case in which the temporarily paused object includes the background, since the pixel values I(X), P(X), and B(X) of the pixels of the positions X including the background are equal to one another, when the absolute value $|I(X)-P(X)|$ of the difference between the pixel value I(X) and the pixel value P(X) is equal to or more than the threshold value th, the absolute value $|P(X)-B(X)|$ of the difference between the pixel value P(X) and the pixel value B(X) is equal to or more than the threshold value th, and the absolute value $|B(X)-I(X)|$ of the difference between the pixel value B(X) and the pixel value I(X) is smaller than the threshold value th, and when the absolute value $|I(X)-P(X)|$ of the difference between the pixel value I(X) and the pixel value P(X) is smaller than the threshold value th, the absolute value |P(X)−B(X)| of the difference between the pixel value P(X) and the pixel value B(X) is smaller than the threshold value th, and the absolute value |B(X)−I(X)| of the difference between the pixel value B(X) and the pixel value I(X) is smaller than the threshold value th, that is, even when the pixel values I(X), P(X), and B(X) are all equal, the reliability processing unit 35 regards the pixel X of the current image as the background pixel and decrements the non-moving object reliability C(X).

Furthermore, when the absolute value |I(X)−P(X)| of the difference between the pixel value I(X) and the pixel value P(X) is equal to or more than the threshold value th, the absolute value |P(X)−B(X)| of the difference between the pixel value P(X) and the pixel value B(X) is equal to or more than the threshold value th, and the absolute value |B(X)−I(X)| of the difference between the pixel value B(X) and the pixel value I(X) is equal to or more than the threshold value th, that is, when the pixel values I(X), P(X), and B(X) are relatively different as shown in FIG. 12C, the reliability processing unit 35 does not regard the pixel X of the current image as the non-moving object pixel and the background pixel, for example, regards the pixel X of the current image as the moving object pixel, sets the update amount ΔC(X) of the non-moving object reliability C(X) for the pixel X to, for example, 0, and updates the non-moving object reliability C(X) according to an equation C(X)=C(X)−ΔC(X) (maintains the non-moving object reliability C(X) as is).

In the above, even though it is highly probable that the pixel X of the current image is the moving object pixel, the reliability processing unit 35 does not decrement the non-moving object reliability C(X) for the pixel X. This is because, when the pedestrian serving as the moving object is in the front of the automobile serving as the non-moving object, the pixel X (X″) of the current image may be the moving object pixel including the moving object as illustrated in FIG. 6.

That is, in the case in which the pedestrian serving as the moving object is in the front of the automobile serving as the non-moving object, when the pixel X is the moving object pixel including the moving object, if the pedestrian serving as the moving object passes by the automobile serving as the non-moving object, the pixel X is the non-moving object pixel including the non-moving object.

Thus, in an image at a certain time, in the case in which the pedestrian serving as the moving object is in the front of the automobile serving as the non-moving object, even when the pixel X is the moving object pixel including the moving object, the pixel X may be the non-moving object pixel in an image at a subsequent time. In such a case, if the non-moving object reliability C(X) for the pixel X is decremented, since the non-moving object pixel may not be detected as the non-moving object, the non-moving object reliability C(X) is not decremented.

FIG. 13 is a diagram explaining details of the update of the non-moving object reliability by the reliability processing unit 35. The reliability processing unit 35 determines whether |I(X)−P(X)|<th, |P(X)−B(X)|<th, and |I(X)−B(X)|<th are satisfied (Yes) or are not satisfied (No), and increments (increases), decrements (decreases), or maintains (neither increases nor decreases) the non-moving object reliability C(X) based on a result of the determination as illustrated in FIG. 13.

That is, it is assumed that the case in which |I(X)−P(X)|<th is satisfied and the case in which |I(X)−P(X)|<th is not satisfied are expressed by [Yes,] and [No,], respectively. Similarly, it is assumed that the case in which |P(X)−B(X)|<th is satisfied and the case in which |P(X)−B(X)|<th is not satisfied are expressed by [,Yes,] and [,No,], respectively, and the case in which |I(X)−B(X)|<th is satisfied and the case in which |I(X)−B(X)|<th is not satisfied are expressed by [,Yes] and [,No], respectively.

In this case, for example, [Yes, Yes, Yes] indicates that |I(X)−P(X)|<th, |P(X)−B(X)|<th, and |I(X)−B(X)|<th are all satisfied.

The reliability processing unit 35 decrements the non-moving object reliability C(X) by, for example, 1 in the case of [Yes, Yes, Yes], increments the non-moving object reliability C(X) by, for example, 1 in the case of [Yes, No, No], decrements the non-moving object reliability C(X) by, for example, 1 in the case of [No, No, Yes], maintains the non-moving object reliability C(X) in the case of [No, No, No], decrements the non-moving object reliability C(X) by, for example, 1 in the case of [No, Yes, No], and decrements the non-moving object reliability C(X) by, for example, 1 in other cases.

In addition, the update amount (the increment amount and the decrement amount) of the non-moving object reliability C(X) is not limited to 1. That is, the reliability processing unit 35 may decrement the non-moving object reliability C(X) by, for example, 2 in the case of [Yes, Yes, Yes], increment the non-moving object reliability C(X) by, for example, 1 in the case of [Yes, No, No], decrement the non-moving object reliability C(X) by, for example, 2 in the case of [No, No, Yes], maintain the non-moving object reliability C(X) in the case of [No, No, No], decrement the non-moving object reliability C(X) by, for example, 2 in the case of [No, Yes, No], and decrement the non-moving object reliability C(X) by, for example, 1 in other cases.

So far, the non-moving object reliability C(X) is updated based on the magnitude relation among three pixel values, that is, the pixel value I(X) of the current image, the pixel value P(X) of the temporarily paused image, and the pixel value B(X) of the background. However, the non-moving object reliability C(X), for example, may be updated based on a magnitude relation between two pixel values, that is, the pixel value I(X) of the current image and the pixel value P(X) of the temporarily paused image.

For example, when |I(X)−P(X)|<th is satisfied, the pixel X may be regarded as the non-moving object pixel and the non-moving object reliability C(X) may be incremented. When |I(X)−P(X)|<th is not satisfied, the pixel X may not be regarded as the non-moving object pixel and the non-moving object reliability C(X) may be decremented.

When the non-moving object reliability C(X) is updated based on the magnitude relation between the two pixel values of the pixel value I(X) of the current image and the pixel value P(X) of the temporarily paused image, the detection accuracy of the non-moving object is reduced as compared with the case in which the non-moving object reliability C(X) is updated based on the magnitude relation among the three pixel values of the pixel value I(X) of the current image, the pixel value P(X) of the temporarily paused image, and the pixel value B(X) of the background, but the non-moving object detection apparatus can be manufactured (in a small size) without the background generation unit 21.

Figure 14:
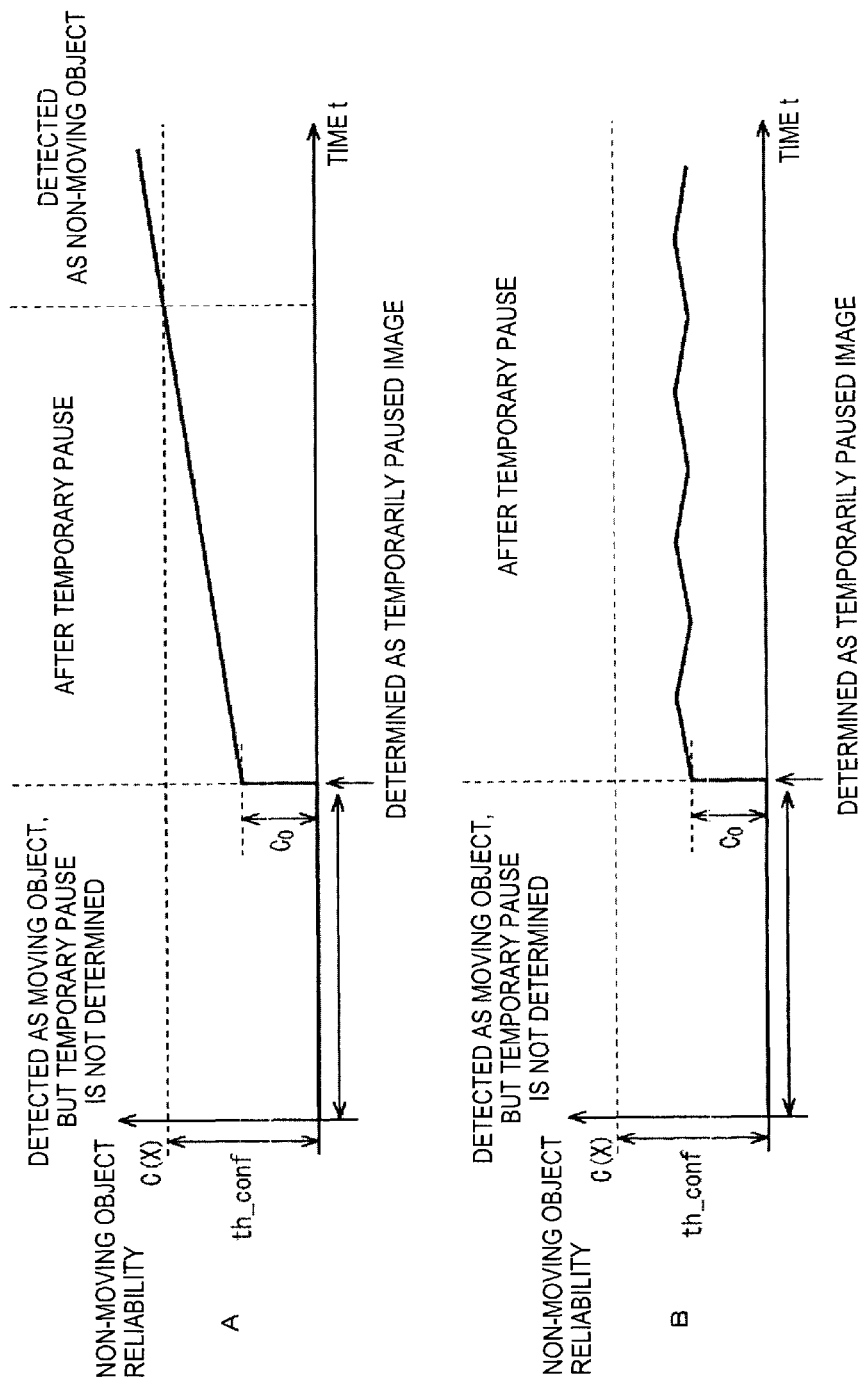
FIG. 14 is a diagram illustrating a variation in non-moving object reliability $C(X)$ updated by a reliability processing unit 35.

FIG. 14 is a diagram illustrating a variation in the non-moving object reliability C(X) updated by the reliability processing unit 35. That is, FIG. 14A illustrates a variation in the non-moving object reliability C(X) for the pixel X when the pixel X is the non-moving object pixel.

When the pixel X is the non-moving object pixel, if the temporary pause determination unit 32 determines that the pixel X is temporarily paused, the pixel X (the pixel value thereof) is stored in the storage unit 34 as a temporarily paused object.

If the pixel X is stored in the storage unit 34 as the temporarily paused object, the reliability processing unit 35 sets (stores) the initial value $C_0$ in the storage unit 36 as the non-moving object reliability $C(X)$ for the pixel X.

When the pixel X is the non-moving object pixel, the non-moving object reliability $C(X)$ for the pixel X is increased (incremented) according to the passage of time. Thus, when the pixel X is the non-moving object pixel, if the initial value $C_0$ is set and then a predetermined time passes, the non-moving object reliability $C(X)$ for the pixel X is a value equal to or more than a threshold value th_conf which is used in the binarization performed by the non-moving object detection unit 37 (FIG. 1), so that the pixel X is detected by the non-moving object detection unit 37 as the non-moving object.

FIG. 14B illustrates a variation in the non-moving object reliability $C(X)$ for the pixel X when the pixel X is a pixel with disturbance in which leaves and the like of a tree being shaken have been reflected.

The temporary pause determination unit 32 may erroneously determine that the pixel X with disturbance, in which leaves and the like of a tree being shaken have been reflected, is temporarily paused, by the influence of the disturbance. In this case, the pixel X (the pixel value thereof) is stored in the storage unit 34 as a temporarily paused object.

If the pixel X is stored in the storage unit 34 as the temporarily paused object, the reliability processing unit 35 sets the initial value $C_0$ in the storage unit 36 as the non-moving object reliability $C(X)$ for the pixel X.

As described above, even after the initial value $C_0$ is set in the non-moving object reliability $C(X)$ for the pixel X, when the pixel X is the pixel with disturbance, in which leaves and the like of a tree being shaken have been reflected, the value of the non-moving object reliability $C(X)$ is randomly incremented, decremented, or maintained in the update of the non-moving object reliability $C(X)$ for the pixel X.

Thus, even after the passage of time, the non-moving object reliability $C(X)$ for the pixel X is not changed from the initial value $C_0$ so much, and is not equal to or more than the threshold value th_conf.

As a consequence, since the pixel X is not detected by the non-moving object detection unit 37 as the non-moving object pixel, it is possible to prevent a pixel with disturbance from being erroneously detected as the non-moving object.

Figure 15:
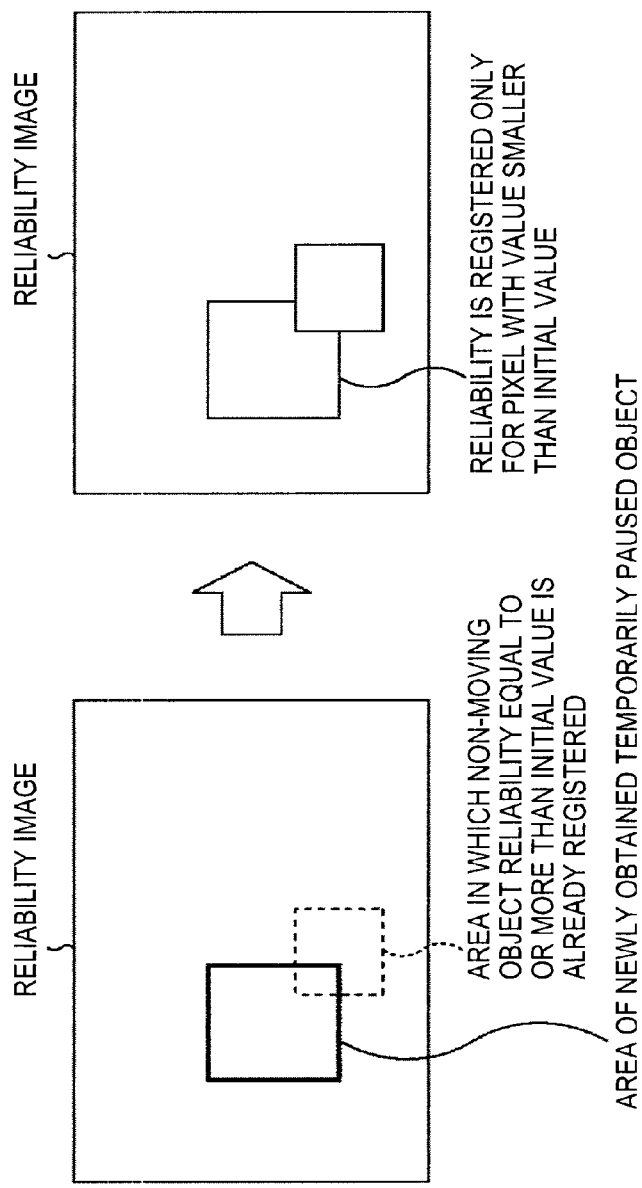
FIG. 15 is a diagram for describing the setting of an initial value $C_0$ of non-moving object reliability $C(X)$ by a reliability processing unit 35.

FIG. 15 is a diagram explaining the setting of the initial value $C_0$ of the non-moving object reliability $C(X)$ by the reliability processing unit 35 of FIG. 1. If a temporarily paused object is newly registered (stored) in the storage unit 34, that is, if a new temporarily paused object is obtained from the current image, the reliability processing unit 35 sets the initial value $C_0$ of the non-moving object reliability $C(X)$ in each pixel constituting the temporarily paused object.

That is, among pixels of the reliability image stored in the storage unit 36 and employing the non-moving object reliability $C(X)$ as a pixel value, the reliability processing unit 35 stores (registers) the initial value $C_0$ as the pixel value of a pixel (a pixel in the same position as the pixel) of the temporarily paused object. In this case, the pixel value of the reliability image stored in the storage unit 36 is overwritten by the initial value $C_0$.

Meanwhile, when a temporarily paused object A has already been obtained and non-moving object reliability has been stored in a pixel in an area of the temporarily paused object A as the pixel value of the reliability image, a temporarily paused object B at least partially overlapping the temporarily paused object A is assumed to be newly obtained.

In this case, for the new temporarily paused object B, if the initial value $C_0$ of the non-moving object reliability is stored in a pixel in an area (an area surrounded by a thick line in FIG. 15) of the temporarily paused object B as the pixel value of the reliability image without restriction, the non-moving object reliability for the temporarily paused object A, which is already larger than the initial value $C_0$, is overwritten by the initial value $C_0$.

When the non-moving object reliability for the temporarily paused object A, which is already larger than the initial value $C_0$, is overwritten by the initial value $C_0$, for example, when the non-moving object reliability before being overwritten is already equal to or more than the threshold value th_conf, there is a problem that a part of the temporarily paused object A detected as the non-moving object may not be unexpectedly detected as the non-moving object.

In this regard, in the case in which the initial value $C_0$ is stored as the pixel value of the reliability image stored in the storage unit 36, when the pixel value of the pixel of the reliability image is already equal to or more than the initial value $C_0$, the reliability processing unit 35 maintains the pixel value of the pixel, which is equal to or more than the initial value $C_0$, and does not store the initial value $C_0$ (retricts overwriting).

That is, when the temporarily paused object is newly obtained, the reliability processing unit 35 stores (sets) the initial value $C_0$ only in a pixel of the reliability image, which has a pixel value smaller than the initial value $C_0$ among pixels in an area of the new temporarily paused object.

In this way, in the reliability image, the pixel value already equal to or more than the initial value $C_0$ is overwritten by the initial value $C_0$, so that it is possible to prevent the non-detection of a non-moving object.

[Process of Non-Moving Object Detection Apparatus]

Figure 16:
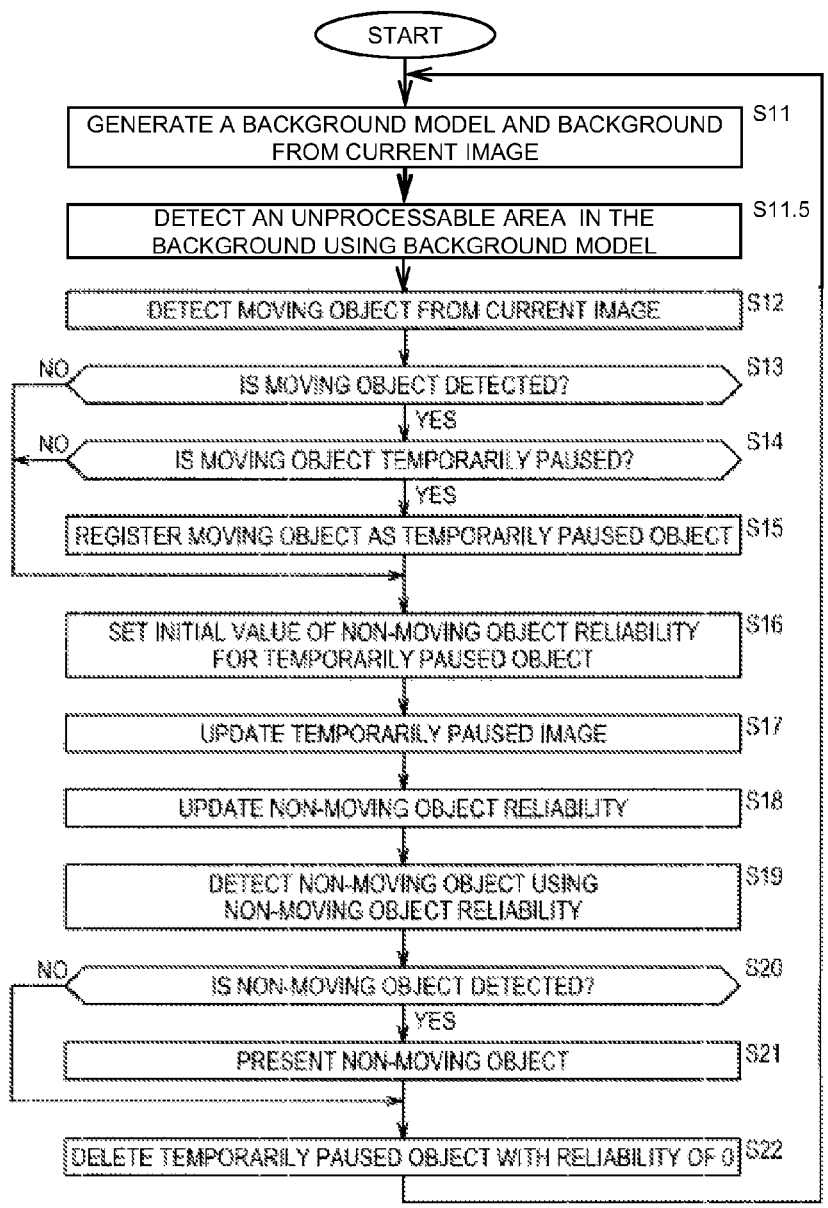
FIG. 16 is a flowchart for describing a process (a non-moving object detection process) of a non-moving object detection apparatus.

FIG. 16 is a flowchart explaining the process (the non-moving object detection process) of the non-moving object detection apparatus of FIG. 1.

The image acquisition unit 11 acquires the latest image, and supplies the latest image to the background generation unit 21, the moving object detection unit 31, the temporarily paused image processing unit 33, the reliability processing unit 35, and the non-moving object presenting unit 38 as a current image.

If the current image is supplied from the image acquisition unit 11, the background generation unit 21 generates (updates) a background using the current image according to Equation 1 above and supplies the background to the reliability processing unit 35 in step S11. Then, the process proceeds to step S12.

In step S12, the moving object detection unit 31 performs the moving object detection process to detect a moving object from the current image from the image acquisition unit 11. Then, the process proceeds to step S13.

In step S13, the moving object detection unit 31 determines whether the moving object has been detected in the moving object detection process of step S12.

When it is determined that the moving object has not been detected in step S13, the process proceeds to step S17 by skipping steps S14 to S16.

Furthermore, when it is determined that the moving object has been detected in step S13, the moving object detection unit 31 supplies the moving object (a moving object area thereof) detected from the current image to the temporary pause determination unit 32 and the temporarily paused image processing unit 33. Then, the process proceeds to step S14.

In step S14, the temporary pause determination unit 32 determines whether the moving object from the moving object detection unit 31 is temporarily paused.

When it is determined that the moving object does not temporarily pause in step S14, the process proceeds to step S17 by skipping steps S15 and S16.

Furthermore, when it is determined that the moving object is temporarily paused in step S14, the temporary pause determination unit 32 supplies the temporarily paused moving object to the temporarily paused image processing unit 33 as a temporarily paused object. Then, the process proceeds to step S15.

In step S15, the temporarily paused image processing unit 33 registers the temporarily paused object from the temporary pause determination unit 32 in the storage unit 34, that is, stores the temporarily paused object in an area of the temporarily paused image stored in the storage unit 34, which corresponds to the temporarily paused object. Then, the process proceeds to step S16.

In step S16, for the temporarily paused object stored in the storage unit 34 in step S15, the reliability processing unit 35 stores (sets) the initial value $C_0$ of the non-moving object reliability in a pixel of the reliability image stored in the storage unit 36, which corresponds to the temporarily paused object. Then, the process proceeds to step S17.

In step S17, the temporarily paused image processing unit 33 updates the temporarily paused image (the temporarily paused object reflected on the temporarily paused image) stored in the storage unit 34 using the current image from the image acquisition unit 11 and the moving object from the moving object detection unit 31 according to Equation 2 and Equation 3 above. Then, the process proceeds to step S18.

In step S18, the reliability processing unit 35 updates non-moving object reliability, which is the pixel value of the reliability image stored in the storage unit 36, using the current image from the image acquisition unit 11, the background from the background generation unit 21, and the temporarily paused image stored in the storage unit 34, as described with reference to FIG. 11 to FIG. 14. Then, the process proceeds to step S19.

In step S19, the non-moving object detection unit 37 performs a detection process to detect a non-moving object from the current image based on the reliability image stored in the storage unit 36. Then, the process proceeds to step S20.

That is, in the detection process, the non-moving object detection unit 37 binarizes the non-moving object reliability, which is the pixel value of the reliability image stored in the storage unit 36, using the threshold value th_conf, thereby obtaining a binarized reliability image.

Moreover, the non-moving object detection unit 37 performs labeling for the binarized reliability image to attach the same label to a pixel with a pixel value of 1 between the pixel (the pixel with the non-moving object reliability equal to or more than the threshold value th_conf) with the pixel value of 1 and eight pixels adjacent to the pixel, thereby detecting a minimum rectangular area circumscribing an area including the pixel with the pixel value of 1 as an area of the non-moving object (a non-moving object area).

In step S20, the non-moving object detection unit 37 determines whether the nor-moving object has been detected in the detection process of step S19.

When it is determined that the non-moving object has not been detected in step S20, the process proceeds to step S22 by skipping step S21.

Furthermore, when it is determined that the non-moving object has been detected in step S20, the non-moving object detection unit 37 calculates non-moving object information including the size, the center coordinate and the like of the non-moving object (the non-moving object area), and supplies the non-moving object information to the non-moving object presenting unit 38. Then, the process proceeds to step S21.

In step S21, based on the non-moving object information from the non-moving object detection unit 37, the non-moving object presenting unit 38 presents the non-moving object (the detection purpose of the non-moving object) using the current image from the image acquisition unit 11 according to the necessity. Then, the process proceeds to step S22.

In step S22, the temporarily paused image processing unit 33 refers to the reliability image stored in the storage unit 36, and deletes the temporarily paused object stored in the storage unit 34 in which the non-moving object reliability (the pixel value) is smaller than the initial value $C_0$, for example, 0.

That is, among pixels of the temporarily paused object stored in the storage unit 34, the temporarily paused image processing unit 33 sets a pixel value of a pixel with the non-moving object reliability of 0 to, for example, 0 and the like.

After a new current image is supplied from the image acquisition unit 11 to the background generation unit 21, the moving object detection unit 31, the temporarily paused image processing unit 33, the reliability processing unit 35, and the non-moving object presenting unit 38, the process returns to step S11 from step S22, so that the same process is repeated.

As described above, the non-moving object detection apparatus of FIG. 1 determines whether the moving object is temporarily paused, updates (generates) the non-moving object reliability using at least the current image and the temporarily paused image including a temporarily paused object serving as a temporarily paused moving object, and detects the non-moving object based on the non-moving object reliability, thereby performing robust non-moving object detection while suppressing erroneous detection.

[Process for Preventing Erroneous Detection]

So far, in the non-moving object detection apparatus of FIG. 1, it is possible to perform robust non-moving object detection while suppressing erroneous detection. However, when an acquired image (an image to be processed) is the following image, the non-moving object detection is likely not to be performed normally. Hereinafter, a description will be provided for a process for detecting an area in which the non-moving object detection may not be performed normally, and performing robust non-moving object detection while further suppressing erroneous detection.

An image for which the non-moving object detection may not be performed normally, for example, includes an image including an area in which many persons or vehicles come and go, such as an image acquired by a camera which photographs an intersection point. In the case of the image including the area in which many persons or vehicles come and go, it is probable that a background will not be generated normally and a non-moving object will be erroneously detected.

In this regard, such an area is detected and an appropriate process is performed. According to the appropriate process, for example, this area is presented to a user by the non-moving object presenting unit 38 such that the user can recognize the area, as will be described later. An area in which a background is not generated normally is detected by the unprocessable area determination unit 22. The unprocessable area determination unit 22 detects an unprocessable area using the background model generated by the background generation unit 21.

As described with reference to FIG. 3 to FIG. 7, the background model is generated in each pixel. As the background model, for example, the background models illustrated in FIG. 3A are generated in the case of a trinomial distribution. Hereinafter, the background model will be described again.

If the current image is supplied from the image acquisition unit 11, the background generation unit 21 in step S11 performs background modeling by analyzing the supplied time-series current image, generates a background model of the multinomial distribution for each pixel as illustrated in FIG.3, and generates a background. The background model is supplied to the unprocessable area determination unit 22 and the reliability processing unit 35 as a background (an image). Further, in step S11.5, the unprocessable area determination unit 22 detects an unprocessable area in the background using the background model generated by the background generation unit 21, and supplies the unprocessable area to the non-moving object presenting unit 38. Then, the process proceeds to step S12.

Furthermore, as with the image at the time t1 of FIG. 2, in the case in which there is an image including a house and a tree is continuously photographed and the tree is shaken, when paying attention to a wall at a predetermined position of the house, the wall may be seen, and leaves of the tree shaken toward the wall may be seen. When seeing such an area, the wall and the leaves of the tree are alternately seen. A background model obtained from the area is highly likely to have a distribution of luminance values of pixels of the wall and a distribution of luminance values of pixels of the leaves of the tree.

As described above, it is estimated that a background model obtained from an image (an area) determined as a background has at least one distribution and the weight of each distribution has a relatively high numerical value. Furthermore, since one distribution has luminance values in a predetermined range, if there is some change in the luminance values, the luminance values may be absorbed in the range. Furthermore, as described with reference to the flowchart of FIG. 4, since the processes including the update, deletion, and generation of a distribution are performed, there is no sudden change in the distribution of the background model in spire of a change in the luminance values of the background.

Thus, the background model obtained from the image determined as the background has a distribution with a high weight. In an area including such a background model, a background is generated normally and a non-moving object is less likely to be erroneously detected.

On the other hand, in a background model obtained from an area in which a moving object such as a vehicle or a person frequently comes and goes and there is a sudden change in luminance values, since the luminance values are suddenly changed, distributions of the luminance values of the background model are dispersed and a weight of one distribution has a low numerical value. In an area including such a background model, a background is not generated normally and a non-moving object is likely to be erroneously detected.

Accordingly, the unprocessable area determination unit 22 detects the area (image) having a probability that a non-moving object is likely to be erroneously detected. Hereinafter, an area in which a non-moving object is likely to be erroneously detected, and even when a non-moving object is detected, the reliability of the detection is low, will be referred to as an unprocessable area. In other words, when a non-moving object is detected through a comparison with a background with high reliability, the non-moving object is detected with high reliability, while an area in which a background is difficult to generate with high reliability will be referred to as the unprocessable area.

On other hand, an area in which a non-moving object is highly likely to be detected normally and the reliability of the detection is high will be referred to as a processable area.

The processable area or the unprocessable area can be determined based on a weight of a distribution with the highest weight and the number of updates in a generated background model as apparent from the aforementioned description. Hereinafter, a description will be provided for a case in which processability is determined when the weight of the distribution with the highest weight is higher than a threshold value calculated by the number of updates and the number of terms, and unprocessability is determined in other cases.

In detail, when a weight of a distribution with the highest weight among distributions of a generated background model is expressed by $Wh(t,X)$, the number of updates of a distribution until determination is made is expressed by $C(t,X)$, and the number of distributions expressed in the background model is N, it is determined whether a pixel belongs to a processable area according to Equation 5 below.

If $Wh(t,X) > \beta \times C(t,X)/N$: processable

Else: unprocessable                    Equation 5

In Equation 5 above, $\beta$ is an adjustment parameter and is set to 1 in a normal case. When a background model is generated in the case of a trinomial distribution, N is 3. $C(t,X)$ denotes the number of updates of a distribution. For example, in the case of a background model obtained by processing 100 frames, $C(t,X)$ is 100. Thus, the number of updates of a distribution is an accumulation of the number of frames to be processed.

Based on Equation 5 above, it may be possible to determine whether an area (pixel) is processable. If the right side of the inequality sign in Equation 5 is set as a predetermined threshold value (fixed value) and a weight is equal to or more than the predetermined threshold value, it may be possible to determine that it is the area (pixel) is processable.

So far, the case in which a background mode is generated in each pixel and it is determined whether an area is processable using the generated background mode based on Equation 5 has been described. That is, in this case, it is determined whether each pixel is processable. It may be possible to employ a configuration in which it is determined whether an area is collectively processable in units of predetermined blocks, rather than each pixel.

In this way, since a pixel determined to be processable and an area including this pixel enables a background to be generated normally, there is no problem in a subsequent process. However, since an image (an area) determined to be unprocessable disables a background from being generated normally and causes erroneous detection of a non-moving object, it is necessary to perform an appropriate process with respect to such an area.

Hereinafter, a description will be provided for a case in which an area determined to be unprocessable is presented to a user as the appropriate process. The output of the determination unit 22 is supplied to the non-moving object presenting unit 38. As described above, the non-moving object presenting, unit 38 presents the fact that a non-moving object has been detected, based on the non-moving object information from the non-moving object detection unit 37. According to the presentation as described above, an on-screen display (OSD) of a frame, which surrounds the non-moving object area specified by the non-moving object information from the non-moving object detection unit 37, is superimposed on the current image from the image acquisition unit 11, and is displayed on a display apparatus (not illustrated).

Similarly to the area in which a non-moving object has been detected, for the area determined to be unprocessable, an on-screen display (OSD) of a surrounding frame is superimposed on the current image from the image acquisition unit 11, and is displayed on a display apparatus (not illustrated), so that the area may be presented to a user. In other words, the non-moving object and the unprocessable area are presented to a user. Since the user confirms the unprocessable area presented to this way, even if the detection of a non-moving object in the area has been presented, the user can recognize that the reliability of the non-moving object detection is low. Furthermore, the user can also determine not to cope with the non-moving object with low reliability.

Once the user has confirmed this, even if it has been determined that it is not the unprocessable area, it is possible to perform a reset process and the like according to an instruction of the user. Furthermore, once the user has confirmed this, even if it has been determined that it is the unprocessable area, the user may stop the presentation of the area, or may change a presentation method. For example, as a confirmation result, when the unprocessable area is highly likely to be an unprocessable area afterward, if the area is continuously presented, it may obstruct a view. Thus, the user may prevent such presentation from being performed, or may paint out the area.

Furthermore, another apparatus connected through a network and the like may be notified of the unprocessable area, and may present the unprocessable area to a user-side using a free display method, or perform another process. In this case, it is possible to generate an image in which the detected unprocessable area has a value of 1 and a processable area a value of 0, and to transmit the image to the other apparatus through the network as metadata.

Furthermore, in Equation 5 above, $\beta$ is a parameter. The parameter $\beta$ may be set by a user. When setting the parameter, a user may directly set a numerical value.

Furthermore, in order to allow the user to easily understand, for example, the parameter may be set in a plurality of steps such as high, intermediate or low. When the parameter has a high value, $\beta$ is set to have a large value. For example, when the parameter is set in three steps of high, intermediate, or low, the parameter $\beta$ is set to have a value of 2 (high), 1 (intermediate), and 0.5 (low).

When $\beta$ is set to have a value larger than 1, since the value of the right side of the inequality sign of Equation 5 becomes large, cases in which the inequality sign is not satisfied may be increased, resulting in an increase in pixels determined to be unprocessable. For example, when a place in which a vehicle does not frequently come and go but a non-moving object is less likely to be detected is to be determined as an unprocessable pixel (area), $\beta$ is set to have a large value.

Figure 17:
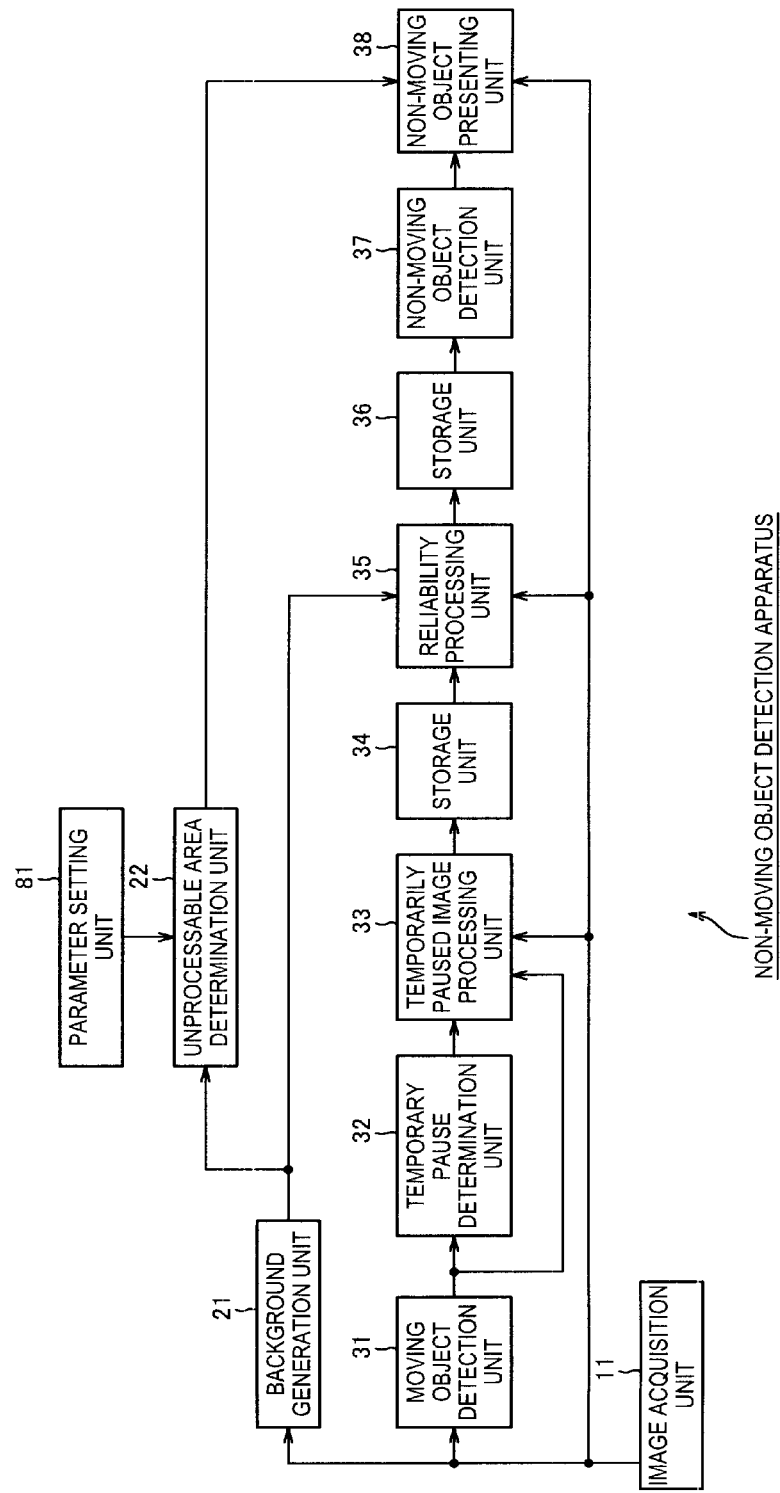
FIG. 17 is a block diagram illustrating another configuration example of a non-moving object detection apparatus.

As described above, the parameter is input to a user, so that it is possible to perform estimation according to use environment of the user and to perform a process and the like using the estimation. As described above, when the user is allowed to set the parameter or perform setting related to a display method and the like of the unprocessable area, a parameter setting unit 81 is provided as illustrated in FIG. 17, so that a parameter set by the parameter setting unit 81 is supplied to the unprocessable area determination unit 22.

The parameter setting unit 81 has a function of acquiring a parameter set by a user, and the like. For example, it may be possible to employ a configuration including an operation unit such as a keyboard. After the parameter set by the parameter setting unit 81 is supplied to the unprocessable area determination unit 22, the unprocessable area determination unit 22 performs a process by substituting the supplied parameter into Equation 5 as the value of $\beta$. As described above, a user may be allowed to set a parameter.

So far, in the aforementioned embodiment, the unprocessable pixel (area) has been described as being presented to a user. However, not only can the unprocessable area be presented, but setting such that the area is not processed can also be performed. For example, it may be possible to employ a configuration (not illustrated) in which information on an area determined as the unprocessable area by the unprocessable area determination unit 22 is supplied to each element of the non-moving object detection apparatus such as the moving object detection unit 31 or the non-moving object detection unit 37. With such a configuration, the moving object detection unit 31, for example, may be allowed to perform setting such that the unprocessable area is not processed (a moving object is not detected from the area), and allowed not to process the area.

With such a configuration, it is possible to reduce a processing load of the non-moving object detection apparatus. As described above, the setting that the unprocessable area is not processed may be performed after the unprocessable area is confirmed by a user and approval of the user is gained.

[Process of Non-Moving Object Detection Apparatus]

Figure 18:
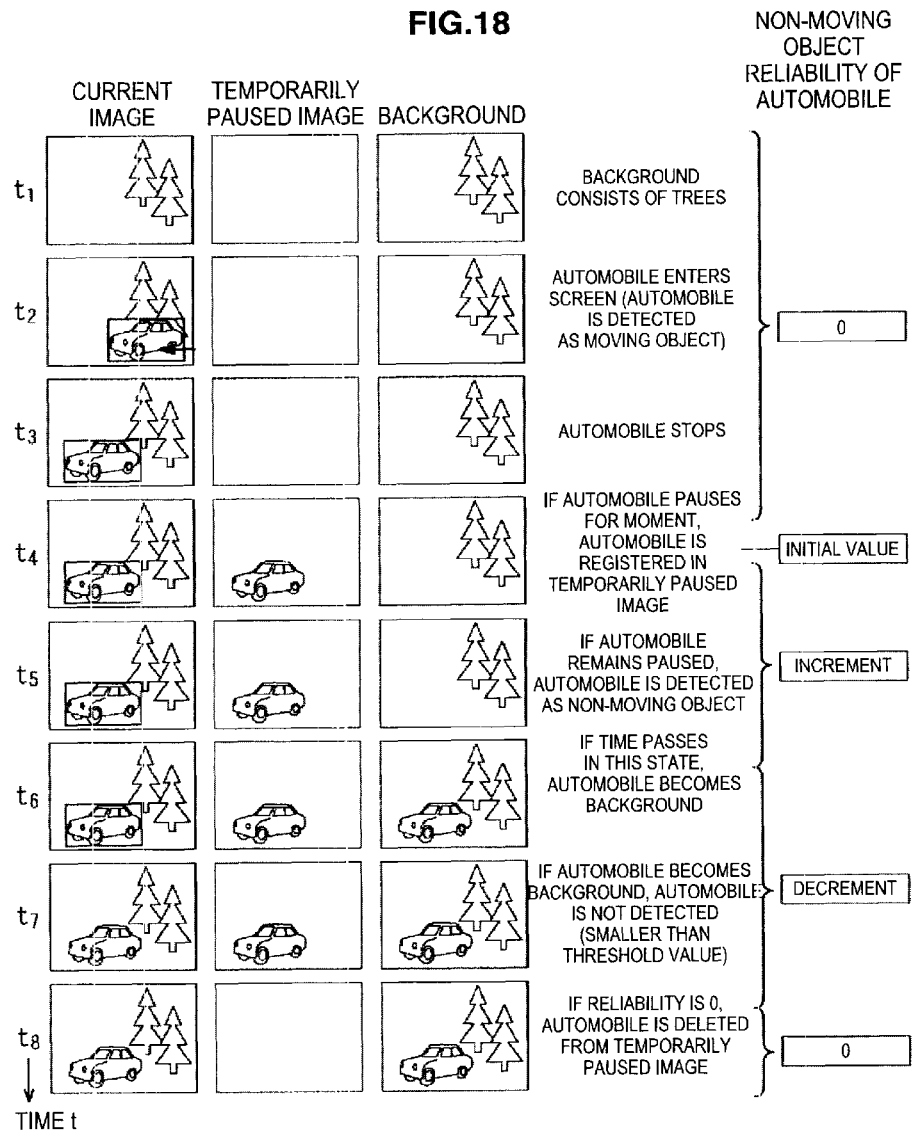
FIG. 18 is a diagram for describing a process of a non-moving object detection apparatus.

With reference to FIG. 18, the process of the non-moving object detection apparatus of FIG. 1 will be described again. In the following description, it is assumed that the unprocessable pixel (area) is not detected.

FIG. 18 illustrates an example of current images, temporarily paused images, and backgrounds at times $t_1$ to $t_8$. In FIG. 18, at the time $t_1$, only trees appear in the current image, and an image including only the trees similarly to the current image is generated by the background generation unit 21 as a background. Furthermore, no temporarily paused object is shown in the temporarily paused image.

At the time $t_2$ after the time $t_1$, an automobile moving from the right to the left starts to appear, and is reflected at the right side of the current image together with the tree. The automobile reflected on the current image is detected by the moving object detection unit 31 as a moving object. Furthermore, an image including only the tree is generated by the background generation unit 21 as a background with no influence of the automobile.

At the time $t_3$ after the time $t_2$, the automobile pauses (stops) and is reflected at the left side of the current image together with the tree. The stopped automobile continues to be detected by the moving object detection unit 31 as a moving object. However, since the automobile has only recently paused, the temporary pause determination unit 32 does not determine that the automobile is temporarily paused and the automobile is not reflected on the temporarily paused image. Furthermore, an image including only the tree is generated by the background generation unit 21 as a back ground with no influence of the automobile.

At the time $t_4$ after the time $t_3$, the automobile continues to pause and is reflected at the left side of the current image together with the tree similarly to the case of the time $t_3$. At the time $t_4$, since the automobile continues to pause only for a predetermined time period, the temporary pause determination unit 32 determines that the automobile is temporarily paused, and the automobile is registered (reflected) in a temporarily paused image, which is stored in the storage unit 34, by the temporarily paused image processing unit 33 as a temporarily paused object. In this way, the temporarily paused image is an image including the automobile serving as the temporarily paused object.

Moreover, at the time $t_4$, the automobile serving as the temporarily paused object is stored in the storage unit 34, so that the reliability processing unit 35 sets an initial value $C_0$ of non-moving object reliability in a pixel value of a pixel of an area in a reliability image stored in the storage unit 36, which corresponds to the automobile serving as the temporarily paused object.

Furthermore, at the time $t_4$, an image including only the tree is generated by the background generation unit 21 as a background with no influence of the automobile.

Between the time $t_4$ and the time $t_5$, the automobile continues to pause and is reflected at the left side of the current image at the time $t_5$ together with the tree similarly to the case of the times $t_3$ and $t_4$. Moreover, the temporarily paused image including the automobile serving as the temporarily paused object is continuously stored in the storage unit 34, and an image including only the tree is generated by the background generation unit 21 as a background with no influence of the automobile.

Thus, from the time $t_1$ through the time $t_5$, for the pixel X of the current image including the automobile serving as the temporarily paused object, in relation to the pixel value I(X) of the pixel X of the current image, the pixel value P(X) of the pixel X of the temporarily paused image, and the pixel value B(X) of the pixel X of the background, since the absolute value |I(X)−P(X)| of the difference between the pixel value I(X) and the pixel value P(X) is smaller than the threshold value th, the absolute value |I(X)−B(X)| of the difference between the pixel value I(X) and the pixel value B(X) is equal to or more than the threshold value th, and the absolute value |B(X)−P(X)| of the difference between the pixel value B(X) and the pixel value P(X) is equal to or more than the threshold value th, the reliability processing unit 35 increments the non-moving object reliability C(X), which is the pixel value of the pixel (the pixel of the position X) X of the reliability image stored in the storage unit 36, as described with reference to FIG. 7A.

At the time $t_5$, the non-moving object reliability C(X) for the pixel X of the current image including the automobile serving as the temporarily paused object is equal to the threshold value th_conf, so that the automobile serving as the temporarily paused object of the current image is detected by the non-moving object detection unit 37 as a non-moving object.

At the time $t_6$ after the time $t_5$, the automobile continues to pause and is reflected at the left side of the current image at the time $t_6$ together with the tree similarly to the case of the times $t_3$ to $t_5$. Moreover, the temporarily paused image including the automobile serving as the temporarily paused object is continuously stored in the storage unit 34.

Moreover, at the time $t_6$, since a time corresponding to about five times of the non-moving object recognition time m has passed from the time $t_3$ at which the automobile has paused, an image including the tree and the automobile is generated by the background generation unit 21 as a background due to the influence of the automobile.

Between the time $t_6$ and the time $t_7$, the automobile continues to pause and is reflected at the left side of the current image at the time $t_7$ together with the tree similarly to the case of the times $t_3$ to $t_6$. Moreover, the temporarily paused image including the automobile is continuously stored in the storage unit 34, and an image including the tree and the automobile is generated by the background generation unit 21 as a background due to the influence of the automobile.

Thus, from the time $t_5$ through the time $t_7$, for the pixel X of the current image including the automobile, in relation to the pixel value I(X) of the pixel X of the current image, the pixel value P(X) of the pixel X of the temporarily paused image, and the pixel value B(X) of the pixel X of the background, since the absolute value |I(X)−P(X)| of the difference between the pixel value I(X) and the pixel value P(X) is smaller than the threshold value th, the absolute value |I(X)−B(X)| of the difference between the pixel value I(X) and the pixel value B(X) is smaller than the threshold value th, and the absolute value |B(X)−P(X)| of the difference between the pixel value B(X) and the pixel value P(X) is smaller the threshold value th, the reliability processing unit 35 decrements the non-moving object reliability C(X), which is the pixel value of the pixel (the pixel of the position X) X of the reliability image stored in the storage unit 36, as described with reference to FIG. 12B.

At the time $t_7$, the non-moving object reliability C(X) for the pixel X of the current image including the automobile is smaller than the threshold value th_conf, so that the automobile of the current image is not detected by the non-moving object detection unit 37 as a non-moving object.

Thereafter, since the automobile continues to pause, the non-moving object reliability C(X) for the pixel X of the current image including the automobile continues to be decremented.

At the time $t_8$ after the time $t_7$, since the non-moving object reliability C(X) for the pixel X of the current image including the automobile is 0, the automobile stored in the storage unit 34, which has non-moving object reliability of 0, is deleted (removed) by the temporarily paused image processing unit 33.

So far, in the above-mentioned cases, when the non-moving object reliability C(X) for the pixel X is equal to or more than the threshold value th_conf, the pixel X is detected as the non-moving object. However, even when the non-moving object reliability C(X) for the pixel X is equal to or more than the threshold value th_conf, if the non-moving object reliability C(X) is monotonically reduced, it is possible to prevent the pixel X from being detected as the non-moving object (the pixel X is not detected as the non-moving object).

That is, in the non-moving object detection apparatus of FIG. 1, for example, when the automobile serving as the temporarily paused object continues to pause and is reflected on the background as described with reference to FIG. 18, if the non-moving object reliability C(X) for the pixel X including the automobile continues to be decremented and becomes smaller than the threshold value th_conf, the automobile is not detected as the non-moving object.

Thus, after the continuously stopped automobile is reflected on the background, since the non-moving object reliability for the pixel including the automobile is monotonically reduced and then becomes smaller than the threshold value th_conf, the automobile is not detected as the non-moving object. As a consequence, the fact that the non-moving object reliability for the pixel including the automobile is monotonically reduced means that the automobile will not be detected as the non-moving object in the future.

In this regard, even when the non-moving object reliability C(X) for the pixel X is equal to or more than the threshold value th_conf, if the non-moving object reliability C(X) is monotonically reduced, it is possible to prevent the pixel X from being detected as the non-moving object.

Figure 19:
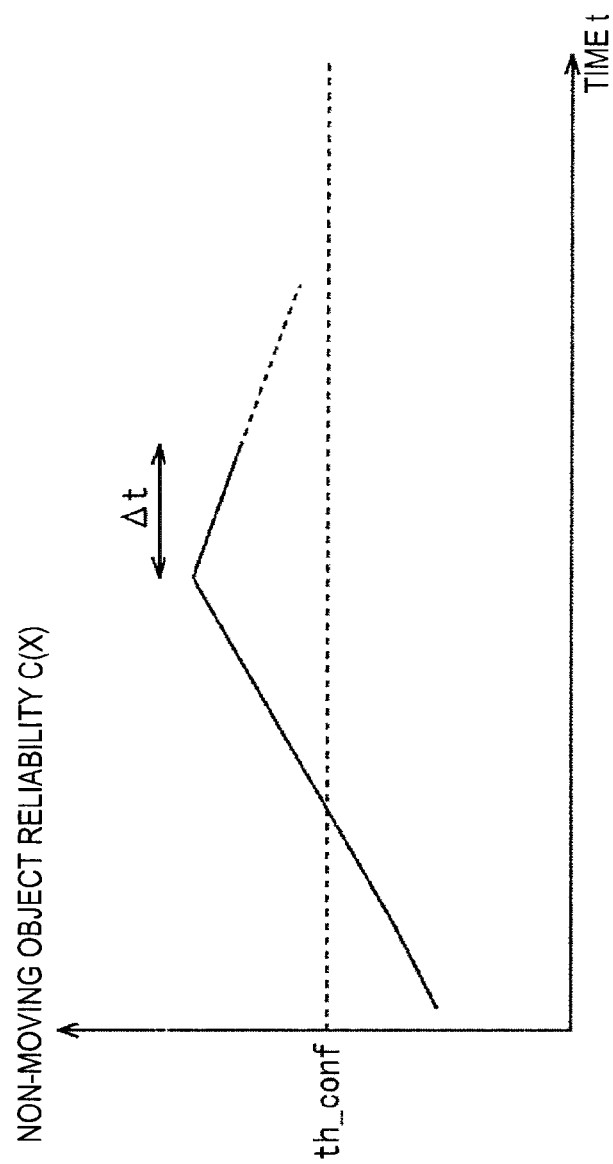
FIG. 19 is a diagram for describing that a pixel X is prevented from being detected as a non-moving object when non-moving object reliability $C(X)$ is monotonically reduced.

FIG. 19 is a diagram explaining that the pixel X is prevented from being detected as the non-moving object when the non-moving object reliability C(X) is monotonically reduced. That is, FIG. 19 is a diagram illustrating the non-moving object reliability C(X).

As illustrated in FIG. 19, even when the non-moving object reliability C(X) for the pixel X is equal to or more than the threshold value th_conf, if the non-moving object reliability C(X) continues to be reduced (is monotonically reduced) only for a predetermined time period Δt, the pixel X is prevented from being detected as the non-moving object in the non-moving object detection unit 37.

In addition, for example, even when the non-moving object reliability C(X) for the pixel X is smaller than the threshold value th_conf, if the non-moving object reliability C(X) continues to be increased (is monotonically increased) only for the predetermined time period Δt, it is possible for the non-moving object detection unit 37 to detect the pixel X as the non-moving object.

[A Plurality of Temporarily Paused Images and Reliability Images]

So far, in the above-mentioned cases, one (corresponding to one screen) temporarily paused image and one reliability image have been assumed to be stored in the storage units 34 and 36 (FIG. 1), respectively. However, a plurality of temporarily paused images and a plurality of reliability images may be stored in the storage units 34 and 36, respectively.

Figure 20:
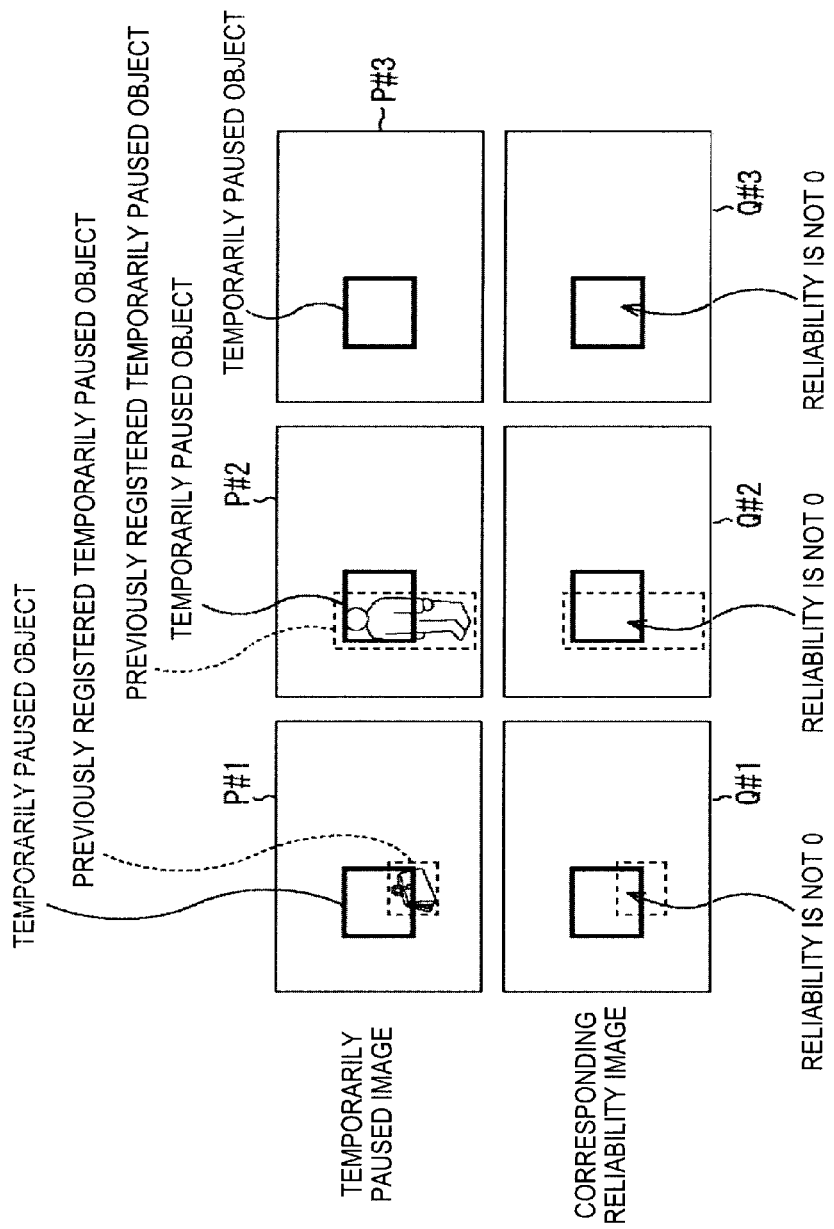
FIG. 20 is a diagram for describing a process of a non-moving object detection apparatus when three temporarily paused images and reliability images are stored in storage units 34 and 36, respectively.

FIG. 20 is a diagram explaining the process of the non-moving object detection apparatus of FIG. 1 when three temporarily paused images and three reliability images are stored in the storage units 34 and 36, respectively.

In addition, the same number of plural temporarily paused images P#i and plural reliability images Q#i are prepared. Furthermore, one temporarily paused image P#i and one reliability image Q#i are associated with each other to be used as a pair.

It is assumed that three temporarily paused images P#1, P#2, and P#3 are stored in the storage unit 34 and three reliability images Q#1, Q#2, and Q#3 forming pairs with the temporarily paused images P#1, P#2, and P#3 are stored in the storage unit 36.

When a new temporarily paused object from the temporary pause determination unit 32 is registered in the storage unit 34, the temporarily paused image processing unit 33 detects one reliability image Q#i, in which each non-moving object reliability of an area corresponding to the temporarily paused object is 0, from the reliability images Q#1 to Q#3 of the storage unit 36.

Then, the temporarily paused image processing unit 33 registers (overwrites) the new temporarily paused object in the temporarily paused image P#i of the temporarily paused images P#1 to P#3 of the storage unit 34, which forms a pair with the reliability image Q#i in which each non-moving object reliability of the area corresponding to the temporarily paused object is 0.

In FIG. 20, among the reliability images Q#1 to Q#3, since only the reliability image Q#3 is an image in which each non-moving object reliability of the area corresponding to the new temporarily paused object is 0, the new temporarily paused object is registered in the temporarily paused image P#3 forming a pair with the reliability image Q#3.

In addition, among the reliability images Q#1 to Q#3, when there is no reliability image in which each non-moving object reliability of the area corresponding to the temporarily paused object is 0, a reliability image, in which an average value of the non-moving object reliability of the area corresponding to the temporarily paused object is minimal, is detected from the reliability images Q#1 to Q#3, and the new temporarily paused object is registered in a temporarily paused image forming a pair with the detected reliability image.

Furthermore, the temporarily paused image processing unit 33 independently updates the temporarily paused images P#1 to P#3 stored in the storage unit 34 according to Equations 1 and 2 above, similarly to the case of one temporarily paused image.

When the temporarily paused object has been newly registered in the temporarily paused image P#i stored in the storage unit 34, the reliability processing unit 35 sets the initial value $C_0$ only in non-moving object reliability as a pixel value of the reliability image Q#i of the reliability images Q#1 to Q#3 stored in the storage unit 36, which forms a pair with the temporarily paused image P#i in which the temporarily paused object has been newly registered, similarly to the case of one temporarily paused image.

Then, the reliability processing unit 35 independently updates each non-moving object reliability of the reliability images Q#1 to Q#3 stored in the storage unit 36 using the temporarily paused image P#i forming a pair with the reliability image Q#i, similarly to the case of one temporarily paused image.

For the reliability images Q#1 to Q#3 stored in the storage unit 36, the non-moving object detection unit 37 independently detects a non-moving object using the reliability image Q#i, similarly to the case of one temporarily paused image.

As described above, since a plurality of temporarily paused images and a plurality of reliability images are used, even when the same number of immobile bodies overlap the temporarily paused images and the reliability images, it is possible to separately detect the overlapping immobile bodies.

[Network Camera employing Present Technology]

Figure 21:
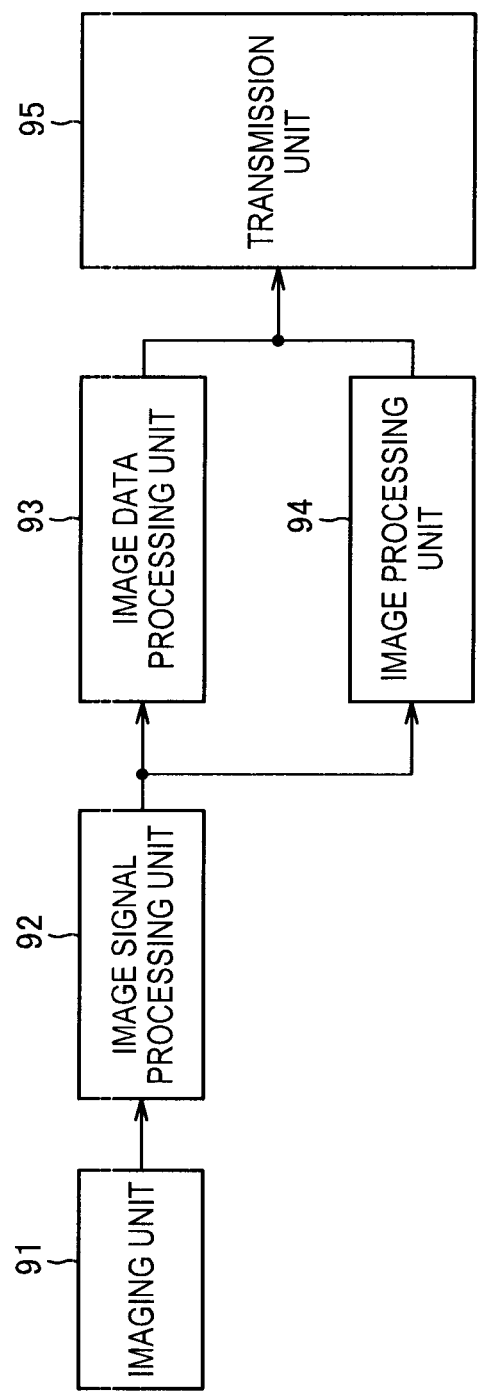
FIG. 21 is a block diagram illustrating a configuration example of a network camera.

It may be possible to employ a configuration in which the non-moving object detection apparatus for detecting a non-moving object, for example, is included in a part of a network camera illustrated in FIG. 21. The network camera illustrated in FIG. 21 includes an imaging unit 91, an image signal processing unit 92, an image data processing unit 93, an image processing unit 94, and a transmission unit 95.

A signal of an image captured by the imaging unit 91 is supplied to the image signal processing unit 92 and is subjected to image processing such as definition enhancement. The signal after the image processing is supplied to the image data processing unit 93, is subjected to a compression process by a compression scheme suitable for the transmission of the transmission unit 95, and is transmitted from the transmission unit 95 to another apparatus through a network.

Furthermore, a signal from the image signal processing unit 92 is also supplied to the image processing unit 94. The image processing unit 94 includes the non-moving object detection apparatus illustrated in FIG. 1 or FIG. 17, and for example, supplies information on a detected non-moving object, information on an area with low reliability as a background, and the like to the transmission unit 95 as metadata. The transmission unit 95 transmits the supplied metadata to the other apparatus through the network together with captured data from the image data processing unit 93.

The non-moving object detection apparatus employing the present technology can be applied to the network camera with such a configuration. Furthermore, although not illustrated in the drawing, the present technology can also be applied to a signal processing IC and the like. Furthermore, the present technology can also be applied to a computer illustrated in FIG. 22.

[Explanation of Computer Employing Present Technology]

Next, a series of processes as described above can be performed by hardware or software. When the series of processes are performed by software, a program constituting the software is installed in a general purpose computer and the like.

Figure 22:
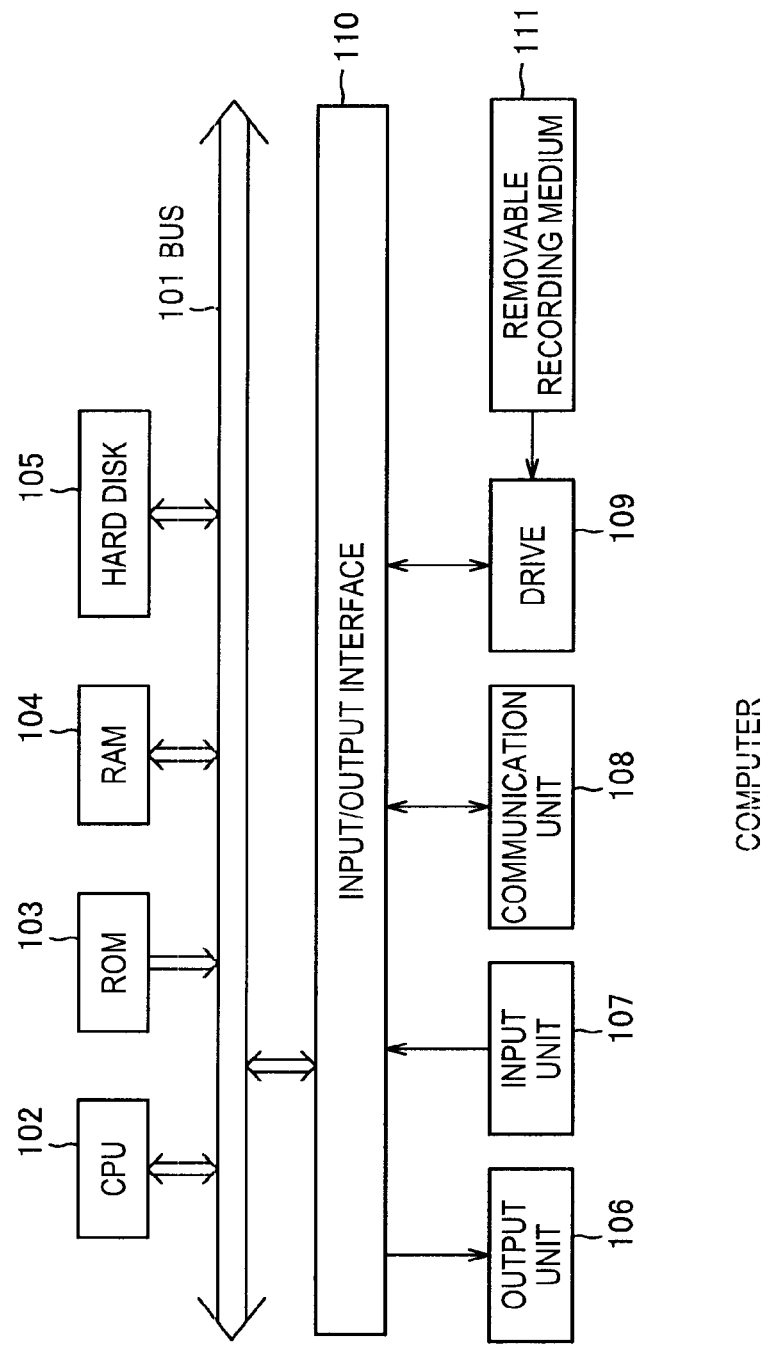
FIG. 22 is a block diagram illustrating a configuration example of an embodiment of a computer employing the present technology.

In this regard, FIG. 22 illustrates a configuration example of an embodiment of a computer in which the program for performing the series of processes is installed.

The program may be recorded in advance on a hard disk 105 or a ROM 103 as a recording medium embedded in the computer.

Alternatively, the program may be stored (registered) in a removable recording medium 111. Such a removable recording medium 111 may be provided as package software. Here, the removable recording medium 111, for example, includes a flexible disk, a compact disc read only memory (CD-ROM), a magneto optical (MO) disc, a digital versatile disc (DVD), a magnetic disk, a semiconductor memory, and the like.

In addition to the installation from the above-mentioned removable recording medium 111 to the computer, the program may be downloaded to the computer through a communication network or a broadcasting network, and may be installed in the hard disk 105 embedded in the computer. That is, the program, for example, may be transmitted from a download server to the computer in a wireless manner through an artificial satellite for digital satellite broadcasting, or may be transmitted from the download server to the computer in a wired manner through a network such as a local area network (LAN) or the Internet.

The computer has a central processing unit (CPU) 102 therein, and an input/output interface 110 is connected to the CPU 102 through a bus 101.

If an input unit 107 is operated by a user and a command is input through the input/output interface 110, the CPU 102 executes the program stored in the read only memory (ROM) 103 according to the command. Alternatively, the CPU 102 loads the program stored in the hard disk 105 to a random access memory (RAM) 104 and executes the loaded program.

In this way, the CPU 102 performs the process based on the above-mentioned flowchart or the process based on the configuration of the above-mentioned block diagram. Then, the CPU 102, for example, outputs a result of the process from an output unit 106 or transmits the result of the process from a communication unit 108 through the input/output interface 110, or registers the result of the process in the hard disk 105 according to the necessity.

In addition, the input unit 107 includes a keyboard, a mouse, a microphone and the like. Furthermore, the output unit 106 includes a liquid crystal display (LCD), a speaker and the like.

In the present specification, the process performed by the computer based on the program may not be performed in time series in the order of the flowchart. That is, the process performed by the computer based on the program includes a process performed in a parallel manner or in an individual manner (for example, a parallel process or an object-based process).

Furthermore, the program may also be executed by one computer (processor), or may also be executed by a plurality of computers in a distribution manner. Moreover, the program may also be transmitted to a remote computer for execution.

It should be understood by those skilled in the art that various modifications, combinations, sub-combinations and alterations may occur depending on design requirements and other factors insofar as they are within the scope of the appended claims or the equivalents thereof.

That is, in the present embodiment, if the non-moving object information is supplied from the non-moving object detection unit 37, the non-moving object presenting unit 38 presents (notifies) a user with (of) the detection purpose of the non-moving object through sound, an image, flicker or lighting of a lamp, and the like. However, the non-moving object information obtained by the non-moving object detection unit 37 may be transmitted through a network together with an image acquired by the image acquisition unit 11 as metadata of the image.

Furthermore, in the present embodiment, through binarization, the non-moving object detection unit 37 sets a pixel value of a pixel of the reliability image stored in the storage unit 36, which has the non-moving object reliability equal to or more than the threshold value to 1 and sets a pixel value of a pixel which has the non-moving object reliability smaller than the threshold value to 0, thereby obtaining a binarized reliability image. However, alternatively, the binarized reliability image, for example, may be obtained through binarization, that is, by setting a pixel value of a pixel of the reliability image, which has the non-moving object reliability equal to or more than the threshold value, includes a temporarily paused object, and exists for a predetermined time period or more after being stored in the storage unit 34, to 1, and setting pixel values of other pixels to 0.

Furthermore, the non-moving object detection apparatus of FIG. 1, for example, can be applied to a network camera capable of transmitting a captured image through a network, an application of an apparatus (an apparatus or a personal computer (PC) for transmitting an analog image through a network) for networking an analog image, or other apparatuses.

In the present specification, "equal to or more than" or "equal to or less than" may represent "larger" or "smaller," or "larger" or "smaller" may represent "equal to or more than" or "equal to or less than."

Furthermore, the present technology may also be configured as below.

(1)

An image processing apparatus including:

a generation unit configured to generate a background model of a multinomial distribution from an acquired image, and generate a background; and a determination unit configured to determine whether a background with high reliability can be generated from the background model generated by the generation unit.

(2)

The image processing apparatus according to (1), wherein the background model includes a distribution in which a luminance value at a predetermined coordinate has been associated with appearance frequency of the luminance value, and when a distribution with highest frequency is larger than a predetermined value, the determination unit determines that the background with high reliability can be generated.

(3)

The image processing apparatus according to (2), wherein the predetermined value is calculated from the number of terms of the multinomial distribution and the number of updates of the background model.

(4)

The image processing apparatus according to any of (1) to (3), wherein an area that is determined by the determination unit as an area in which the background with high reliability cannot be generated is presented to a user.

(5)

The image processing apparatus according to (1), further including:

a moving object detection unit configured to detect a moving object, which is an image different from the background generated by the generation unit, in a current image;

a temporary pause determination unit configured to determine whether the moving object is paused for a predetermined time period or more;

a reliability processing unit configured to calculate non-moving object reliability for a pixel of the current image using the current image and a temporarily paused image including a temporarily paused object serving as the moving object which is paused for a predetermined time period or more, the non-moving object reliability representing likelihood of being a non-moving object which is an image different from the background that does not change for a predetermined time period or more; and a non-moving object detection unit configured to detect the non-moving object from the current image based on the non-moving object reliability.

(6)

An image processing method including:

generating a background model of a multinomial distribution from an acquired image, and generating a background; and determining whether a background with high reliability can be generated from the generated background model.

(7)

A program for causing a computer to function as:

a generation unit configured to generate a background model of a multinomial distribution from an acquired image, and generate a background; and a determination unit configured to determine whether a background with high reliability can be generated from the background model generated by the generation unit.

The present disclosure contains subject matter related to that disclosed in Japanese Priority Patent Application JP 2011-202748 filed in the Japan Patent Office on Sep. 16, 2011, the entire content of which is hereby incorporated by reference.

What is claimed is:

1. An image processing apparatus comprising:
   a generation unit configured to generate a background model of a multinomial distribution from an acquired image, and generate a background image using the background model;
   a moving object detection unit configured to detect a moving object in the acquired image, wherein the moving object is an area in the acquired image different from the background image; and
   a reliability processing unit configured to calculate a value for a pixel of the acquired image indicating a probability of the pixel being a non-moving object using the acquired image, the background image and a temporarily paused image, wherein the temporarily paused image comprises the moving object which is paused for at least a predetermined time period,
   wherein the background model includes a distribution in which a luminance value at a predetermined coordinate is associated with an appearance frequency of the luminance value, and wherein a determination unit determines the predetermined coordinate as a processable area when the distribution with highest appearance frequency among distributions in the multinomial distribution is larger than a predetermined value,
   wherein the predetermined value is calculated from a number of terms of the multinomial distribution and a number of updates of the background model.

2. The image processing apparatus according to claim 1, wherein the determination unit is configured to detect an unprocessable area in the background image, wherein the detected unprocessable area in the background image is presented to a user.

3. The image processing apparatus according to claim 1, further comprising:

a temporary pause determination unit configured to determine whether the moving object is paused for at least the predetermined time period; and a non-moving object detection unit configured to detect the non-moving object from the acquired image based on the value, wherein the value indicates the probability of the pixel of the acquired image being the non-moving object which is an image different from the background image.

4. The image processing apparatus according to claim 1, wherein the determination unit is configured to detect an unprocessable area in the background image, wherein the detected unprocessable area in the background image is an area in which a distribution with highest appearance frequency among distributions in the multinomial distribution is less than a predetermined value.

5. The image processing apparatus according to claim 1, wherein the background model is generated for each of a plurality of pixels in the acquired image.

6. The image processing apparatus according to claim 1, wherein the generation unit generates the background model of a trinomial distribution.

7. An image processing method comprising:
   in an image processing apparatus comprising one or more processors:
   generating a background model of a multinomial distribution from an acquired image, and generating a background image using the background model,
   wherein the background model includes a distribution in which a luminance value at a predetermined coordinate is associated with an appearance frequency of the luminance value, wherein the predetermined coordinate is determined as a processable area when the distribution with highest appearance frequency among distributions in the multinomial distribution is larger than a predetermined value, and
   wherein the predetermined value is calculated from a number of terms of the multinomial distribution and a number of updates of the background model.

8. The image processing method according to claim 7, comprising:
   detecting a moving object in the acquired image, wherein the moving object is an area in the acquired image different from the background image;
   calculating a value for a pixel of the acquired image indicating a probability of the pixel being a non-moving object using the acquired image, the background image and a temporarily paused image, wherein the temporarily paused image comprises the moving object which is paused for at least a predetermined time period;
   determining whether the moving object is paused for at least the predetermined time period; and
   detecting the non-moving object from the acquired image based on the value, wherein the value indicates the probability of the pixel of the acquired image being a non-moving object which is an image different from the background image.

9. The image processing method according to claim 8, wherein the predetermined time period is set by a user.

10. A non-transitory computer-readable recording medium having a set of instructions recorded thereon, the set of instructions causing a computer to perform steps comprising:
    generating a background model of a multinomial distribution from an acquired image, and generating a background image using the background model,
    wherein the background model includes a distribution in which a luminance value at a predetermined coordinate is associated with an appearance frequency of the luminance value, wherein the predetermined coordinate is determined as a processable area when the distribution with highest appearance frequency among distributions in the multinomial distribution is larger than a predetermined value, and wherein the predetermined value is calculated from a number of terms of the multinomial distribution and a number of updates of the background model.

11. An image processing apparatus comprising:
a generation unit configured to generate a background model of a multinomial distribution from an acquired image, and generate a background image using the background model; and
a determination unit configured to detect an unprocessable area in the background image using the background model,
wherein the background model includes a distribution in which a luminance value at a predetermined coordinate is associated with an appearance frequency of the luminance value, and wherein the determination unit determines the predetermined coordinate as a processable area when a distribution with a highest appearance frequency among distributions in the multinomial distribution is greater than a predetermined value at the predetermined coordinate, and
wherein the predetermined value is calculated from a number of terms of the multinomial distribution and a number of updates of the background model.

12. An image processing apparatus comprising:
a generation unit configured to generate a background model of a multinomial distribution from an acquired image, and generate a background image using the background model;
a determination unit configured to detect an unprocessable area in the background image using the background model;
a moving object detection unit configured to detect a moving object in the acquired image, wherein the moving object is an area in the acquired image different from the background image;
a temporary pause determination unit configured to determine whether the moving object is paused for at least a predetermined time period;
a reliability processing unit configured to calculate a value for a pixel of the acquired image using the acquired image and a temporarily paused image, wherein the temporarily paused image comprises the moving object which is paused for at least the predetermined time period, wherein the value indicates a probability of the pixel of acquired image being a non-moving object which is an image different from the background image that does not change for at least the predetermined time period; and
a non-moving object detection unit configured to detect the non-moving object from the acquired image based on the value.

* * * * *